(12) United States Patent
Piasecki et al.

(10) Patent No.: US 11,384,736 B1
(45) Date of Patent: Jul. 12, 2022

(54) FLOATING OFFSHORE WIND TURBINE SYSTEM, APPARATUS AND METHOD

(71) Applicant: Piasecki Aircraft Corporation, Essington, PA (US)

(72) Inventors: Frederick W. Piasecki, Haverford, PA (US); Dinesh Barwey, Wayne, PA (US); George Luis Firpi, Glenolden, PA (US); David Joseph Stilwell, Newtown Square, PA (US)

(*) Notice: Subject to any disclaimer, the term of this patent is extended or adjusted under 35 U.S.C. 154(b) by 0 days.

(21) Appl. No.: 16/987,621

(22) Filed: Aug. 7, 2020

Related U.S. Application Data

(60) Provisional application No. 62/884,197, filed on Aug. 8, 2019.

(51) Int. Cl.
| | | |
|---|---|---|
| F03D 13/00 | (2016.01) | |
| F03D 13/25 | (2016.01) | |
| B63B 35/44 | (2006.01) | |

(52) U.S. Cl.
CPC ........ F03D 13/25 (2016.05); *B63B 2035/446* (2013.01)

(58) Field of Classification Search
CPC ... B63B 22/18; B63B 2035/446; B63H 15/00; F03D 13/25
See application file for complete search history.

(56) References Cited

U.S. PATENT DOCUMENTS

| | | | |
|---|---|---|---|
| 6,819,073 B2 | 11/2004 | Heinemann et al. | |
| 6,979,171 B2 | 12/2005 | Lauritesn | |
| 7,075,189 B2 | 7/2006 | Heronemus | |
| 7,156,037 B2 | 1/2007 | Borgen | |
| 7,156,586 B2 | 1/2007 | Nim | |
| 7,307,356 B2* | 12/2007 | Fraenkel | F03B 13/264 290/54 |
| 7,456,515 B2 | 11/2008 | Nielsen | |
| 7,612,462 B2 | 11/2009 | Viterna | |
| 7,819,073 B2 | 10/2010 | Sveen | |
| 8,197,208 B2 | 6/2012 | Sharples | |
| 8,692,401 B2 | 4/2014 | Rodler | |
| 9,810,204 B2 | 11/2017 | Aubault | |
| 2012/0103244 A1 | 5/2012 | Gong | |
| 2012/0256423 A1 | 10/2012 | Liu | |
| 2013/0272846 A1* | 10/2013 | Inoue | F03B 17/06 415/3.1 |

FOREIGN PATENT DOCUMENTS

WO WO-2019147983 A1 * 8/2019 ............. B63B 35/44

* cited by examiner

*Primary Examiner* — Julio C. Gonzalez

(74) *Attorney, Agent, or Firm* — Robert J. Yarbrough; Lipton, Weinberger & Husick

(57) ABSTRACT

A floating offshore wind turbine includes a rotor and a generator turned by the rotor. An elongated buoyant body supports a tower that supports the generator and rotor. The buoyant body or the tower may support aerodynamic features to counteract heeling forces or to steer the floating wind turbine as it swings on its anchor line. The floating offshore wind turbine may be configured to move the anchor line force vector to counteract heeling forces. A control system may control the aerodynamic features and the movement of the anchor line force vector.

19 Claims, 22 Drawing Sheets

FLOATING OFFSHORE WIND TURBINE SYSTEM, APPARATUS AND METHOD

I. BACKGROUND OF THE INVENTION

A. Field of the Invention

The present invention relates to an offshore floating wind turbine system and apparatus and to a method for controlling the wind turbine. The floating wind turbine system may utilize dynamic feedback control of aerodynamic control surfaces and dynamic control of the anchor line force vector to counter heeling and other forces and moments acting on the wind turbine. The resultant wind turbine apparatus, system and method reduce the structural mass and hence cost of the floating wind turbine.

B. Statement of the Related Art

Current technology for wind turbines for commercial power production located at sea is limited to towers permanently installed at shallow depths, i.e., less than approximately 30 meters. Large megawatt-sized wind turbines that require fixed installation and a base that extends to the sea floor are costly due to the mass of material and the commensurate construction cost.

Floating wind turbines allow operation in deeper water. For a floating wind turbine supported by a buoyant body that is attached to the sea floor by one or more anchor lines, the wind pushing on the wind turbine tower, rotor, nacelle and other systems above the waterline and hydrodynamic and hydrostatic forces acting on the buoyant body below the waterline may cause the wind turbine to 'heel;' that is, to tilt in the downwind direction. Excessive heel may cause the turbine rotor to strike the tower or may reduce the efficiency and capacity factor of the wind turbine. The 'capacity factor' of a wind turbine is the actual output of the turbine compared to the total mechanical ability of the wind turbine to generate power, given sufficient wind. All other things being equal, a wind turbine operating at a higher capacity factor is better utilized and more valuable than a wind turbine operating at a lower capacity factor.

When the floating wind turbine heels, a 'righting moment' tends to restore the wind turbine to the upright condition. The righting moment for a floating body is determined primarily by a buoyancy vector acting through the center of buoyancy of the floating body and the equal and opposite mass vector acting through the center of gravity, and by the horizontal distance between those two vectors. For a wind turbine floating on a long, thin buoyant body with the center of buoyancy above the center of gravity, as the heel angle increases, the distance between the buoyancy vector and the mass vector increases, increasing the righting moment. For a conventional floating wind turbine, the buoyancy and the mass must both be relatively large and the center of buoyancy and the center of mass must be separated by a relatively large distance to generate a sufficient righting moment to keep the wind turbine generally upright. As a result, the conventional floating wind turbine will extend deep under the water, all requiring a floating buoyant body structure that is relatively large, heavy and expensive.

Wind turbines are broadly divided into horizontal and vertical wind turbines, with horizontal wind turbines divided into upwind and downwind types. In a horizontal downwind wind turbine, the axis of rotation of the rotor is horizontal and the rotor is located on the downwind side of the tower. In a horizontal upwind wind turbine, the axis of rotation of the rotor is horizontal and the rotor is located on the upwind side of the tower. For a vertical wind turbine, the axis of rotation of the rotor is vertical.

What is needed is a floating wind turbine that has a tower and buoyant body that are lighter than land-based designs and where the wind turbine achieves a relatively large capacity factor and extended life due to reduced inertial and other loads, reduced heel, reduced motion and reduced accelerations caused by variable dynamic motions of wind and water.

II. BRIEF DESCRIPTION OF THE INVENTION

The wind turbine of the Invention comprises a long, low mass, thin buoyant body, a tower arranged over the buoyant body, a generator mounted on the tower and contained within a nacelle, and a rotor operably attached to the generator through a rotor hub. Where the wind turbine is a horizontal wind turbine, the nacelle, generator and rotor are rotatable in pitch about a pitch hinge to compensate for heel of the buoyant body and tower. The tower supports the pitch hinge above the center of gravity of the generator structure, which includes the nacelle, generator, rotor hub and rotor. A pitch actuator system under the control of a control system moves the generator structure about the pitch hinge and maintains the rotor axis of rotation in a horizontal condition perpendicular to the movement of inflowing air. Adjustment of the rotor axis of rotation in pitch allows efficient operation of the rotor when the wind turbine heels and improves the capacity factor of the wind turbine as well as load reduction.

The wind turbine may be a horizontal upwind or downwind wind turbine and may be a vertical wind turbine. The Invention applies to any floating wind turbine design where control of heel, motions, and accelerations of the rotor and other wind turbine components is desirable, which applies to all floating wind turbines.

To control heel angle, motions and accelerations of the rotor hub and other wind turbine components, the Invention may utilize either or both of aerodynamic forces working on aerodynamic control surfaces and an anchor line force applied by one or more anchor lines to the buoyant body. Each of these control strategies is discussed below.

Aerodynamic Control Surfaces

The tower or buoyant body supporting the wind turbine may include one or more aerodynamic surfaces in a spaced-apart relation to the vertical axis of the tower. The aerodynamic control surfaces may be spaced equally from the tower. The spaced-apart relation of the control surfaces and the vertical axis of the tower allows the control surfaces to apply a dynamic and static moment around the center of gravity of the wind turbine. The control surfaces may be supported in the spaced-apart relation by a support structure and may be arrayed around the tower. Any number of control surfaces are contemplated by the Invention. For example, control surfaces may be located at four or more locations distributed about the tower axis. Air moving over the control surfaces acts to counter the moments produced by the wind and waves tending to heel the wind turbine and tending to accelerate and move the wind turbine's hub. The control surfaces are active and under the command of a control system. The control system moves the control surfaces as needed to reduce accelerations and in response to disturbing forces.

The control surfaces may comprise box wings composed of both horizontal control surfaces and vertical control surfaces. Each of the horizontal and vertical control surface may be moved independently by an actuator. One of the functions of the vertical control surfaces is to keep the box wing aligned to the wind direction by pivoting the box wing on a vertical axis. Because the control surfaces are distributed around the tower body, the control surfaces can apply moments and forces to the wind turbine in vertical and horizontal directions. The moments and forces applied by the control surfaces to the wind turbine can affect the motion of the wind turbine in any or all of the six degrees of freedom for a floating object; namely, roll, pitch and yaw (rotation in the x, y and z axes) and surge, sway and heave (translation in the x, y and z directions).

Sensors may be located at a spaced apart relation to the tower, such as at the location of each of the box wings, to detect wind speed and direction at the control surfaces. The control system thus may detect a wind gust or acceleration at or near the tower or control surfaces.

The control system described below may select an angle of attack of each of the control surfaces with respect to the wind passing over the control surface and may direct actuators to move the control surfaces to the selected angles of attack to counteract the heeling angle, accelerations and forces acting on the wind turbine. When the detected environmental and other conditions approach allowable operating limits, the control system also may determine that the wind turbine may not operate safely and may command actuators to feather and stop the rotor blades.

The use of aerodynamic control surfaces allows the wind turbine to maintain heel angles within acceptable limits in weather conditions beyond what would be the case without the aerodynamic control surfaces and limits unwanted accelerations to the rotor by wind and wave action. The aerodynamic control features and the anchor line actuators, discussed below, may be used together or separately.

Anchor Line Force Vector

An anchor line, which may be a single anchor line or multiple anchor lines, holds the floating wind turbine in place against the forces of wind and water. The anchor line applies an anchor line force vector to the wind turbine at the buoyant body. The connection of the anchor line to the buoyant body may be adjusted using one or more anchor line actuators. The anchor line actuators change the location of the anchor line force vector with respect to the buoyant body in the vertical and lateral directions. Changing the location of the anchor line force vector can increase the righting moment applied to the wind turbine by the anchor line force vector, decrease the heeling moment applied to the wind turbine by the anchor line force vector, and adjust the motion of the wind turbine in yaw, all as discussed below.

The anchor line force vector has two components—a horizontal component and a vertical component. The horizontal component is equal to the net force of wind and water on the wind turbine and keeps the wind turbine at its selected location. The vertical component is equal to the weight of the anchor line that is not resting on the sea floor, less the weight of water displaced by the anchor line. Because the wind turbine of the invention may operate in deep water, the anchor line may be long and may have substantial weight. The anchor line actuators selectably move the vertical component of the anchor line force vector away from the center of buoyancy of the buoyant body in the upwind direction when the wind turbine is experiencing excessive heel, so that the vertical component of the anchor line force vector applies a righting moment to the wind turbine and reduces heel.

If the anchor line is attached to the wind turbine below the centers of gravity and buoyancy, the horizontal component of the anchor line force vector applies a heeling moment to the wind turbine that is additive to the heeling moment caused by the forces of wind and current. By raising the anchor line attachment location with respect to the centers of gravity and buoyancy, an anchor line actuator may reduce and even reverse the heeling moment caused by the horizontal component of the anchor line force vector.

The anchor line actuator may both raise the anchor line attachment location and move the attachment location away from the center of buoyancy in the upwind direction.

The connection of the anchor line to the buoyant body may comprise a rotatable beam that is movable by the anchor line actuators with respect to the buoyant body to change the location of the anchor line force vector laterally and vertically. The rotatable beam may comprise a single link that is hinged to move about a pin from a first position, in which the anchor line attachment is located proximal to the longitudinal axis of the tower, to a second position in which the anchor line attachment location is located distal to the longitudinal axis of the tower in the upwind direction. The rotatable beam also may occupy any position between the first and second positions. Any suitable mechanism known in the art may be used to move the rotatable beam between the first and second positions, including one or more hydraulic cylinders, cables powered by electric motors, hydraulic motors, or hydraulic cylinders, lead screws turned by electric or hydraulic motors, screw jacks, or by any other suitable mechanism.

Alternately, an extendable beam may comprise a cantilever beam that selectably extends laterally from the buoyant body, as by a hydraulic ram, by a rack-and-pinion, by a screw thread, by the operation of cables on a capstan, or by any means known in the art for extending one object from another object.

An extendable knee may move the anchor line attachment location and may be defined by a scissor linkage having two or more links operated hydraulically, by a screw, or by any other means known in the art, including the means described elsewhere in this document.

As an alternative, the buoyant body may define a track that extends in a lateral direction with respect to the longitudinal axis of the buoyant body. The anchor line may be attached to a shuttle that is selectably movable on the track. The control system controls the location of the shuttle on the track to change the location of the anchor line vector with respect to the buoyant body. The trolley may be moved by a screw thread, by a rack and pinion or other gear train, by cables actuated by one or more hydraulic cylinders or motors, by wedges, by gravity, or by any means known in the art or described in this document.

Movement of the rotatable beam described above may be aided by a ratchet and pawl. In normal operation, the control system keeps the ratchet and pawl in a locked condition so that the rotatable beam does not move. When the control system detects heel angles above a pre-determined threshold, the control system releases the pawl. The heel angle of the buoyant body increases and decreases as the wind and waves ebb and flow. Each time the heel angle decreases, the angle of the anchor line changes with respect to the buoyant body and the pawl advances on the ratchet, moving the anchor line vector with respect to the buoyant body. When the heel angle drops below the pre-determined threshold for a pre-determined period of time, the control system locks the pawl, fixing the rotatable beam in place in the second position. When the control system detects that conditions such as wind speed, wave height and heel angle have subsided consistent with normal operation, the control system releases the pawl and the weight of the rotatable beam and anchor line pull the rotatable beam to the first position.

The rotatable beam either with or without the ratchet and pawl may be equipped with a variable flotation body. When the control system detects heel angles above the pre-determined threshold, the control system may both release the pawl and pump air into flotation chambers on the rotatable beam to assist in raising the rotatable beam. If the buoyancy of the variable flotation body exceeds the weight of the anchor line above the sea floor less the weight of the displaced water, the variable flotation body alone may lift the anchor line and rotatable beam without the use of the pawl. When the rotatable beam is in the raised position, the control system locks the rotatable beam in place, as by a pin inserted by a hydraulic cylinder or solenoid. When the heel angle is below the pre-determined threshold for a pre-determined period of time, the control system locks the rotatable beam in the second position. When the control system detects conditions consistent with normal operation, the control system may release the rotatable beam. The weight of the rotatable beam and the anchor lines return the rotatable beam to the first position.

The adjustable connection of the anchor line to the buoyant body allows the control system to change the location of the anchor line force vector acting on the wind turbine. The adjustable connection may allow the wind turbine to resist wind forces tending to heel the wind turbine and to maintain a heel angle within acceptable operating limits in conditions that would otherwise require shutdown of the wind turbine. Changing the location of the anchor line connection to the buoyant body also allows the wind turbine to operate at a higher torque input than would be the case without changing the location of the anchor line connection.

Because the anchor line is attached to the buoyant body at a single location, the floating buoyant body is free to move passively in yaw like a weathervane in response to the wind and water. Selectably moving the anchor line force vector in the upwind or downwind direction with respect to the centers of buoyancy and gravity allows the control system to passively trim the yaw position of the wind turbine and to reduce or eliminate yawing oscillation of the wind turbine. The result is that the floating wind turbine of the Invention can eliminate the heavy and expensive yaw bearing required by land-based wind turbines. The anchor line vector actuators are effective to restrain the motion of the wind turbine in yaw and to keep the plane of rotation of the rotor orthogonal to the incoming wind and as such to reduce rotor blade flapping and high cyclic loads.

The control system controls the operation of the generator, the rotor pitch, the generator actuator system, the anchor line actuator system and the aerodynamic control surfaces. The control system may autonomously control startup, operation, rotor blade pitch angle, shutdown, and parking of the rotor. The control system may be in communication with a remote operator, as by radio, may receive instructions from the remote operator, and may execute the instructions from the remote operator. The control system may receive information from a remote location, such as weather information and wind turbine location information, and may autonomously act upon that information, as by shutting down the wind turbine and parking the rotor blades in anticipation of a predicted storm.

The control system may detect environmental conditions, such as wind direction and speed, water current direction and speed and wave height. The control system may also detect the heel angle of the tower, heel angle rate of change, the nacelle pitch angle, nacelle pitch angle rate of change, nacelle frequency, the flapping angle of each rotor blade, the deflection of each rotor blade, accelerations acting on the rotor hub, the rotational speed of the rotor, the radial location of the rotor blades, nacelle pitch angle, and any other parameter that a wind turbine operator may find useful. From this information, the control system may select independently the pitch angle of each rotor blade at each radial location as each rotor blade rotates about the rotor hub.

The rotor may be foldable and parkable under the control of the control system, as described by U.S. Pat. No. 7,821,148 issued Oct. 26, 2010, which is incorporated by reference as if set forth in full herein. The blades of the rotor may be constructed as described by U.S. Pat. No. 8,192,169 issued Jun. 5, 2012, and U.S. Pat. No. 8,863,382 issued Oct. 21, 2014, which are incorporated by reference as if set forth in full herein.

The wind turbine of the Invention offers the advantages of reduced construction cost and an increased capacity factor compared to prior art designs. The net result is that the wind turbine uses less material and is hence less expensive than would otherwise be the case.

III. BRIEF DESCRIPTION OF THE DRAWINGS

Figure 20:
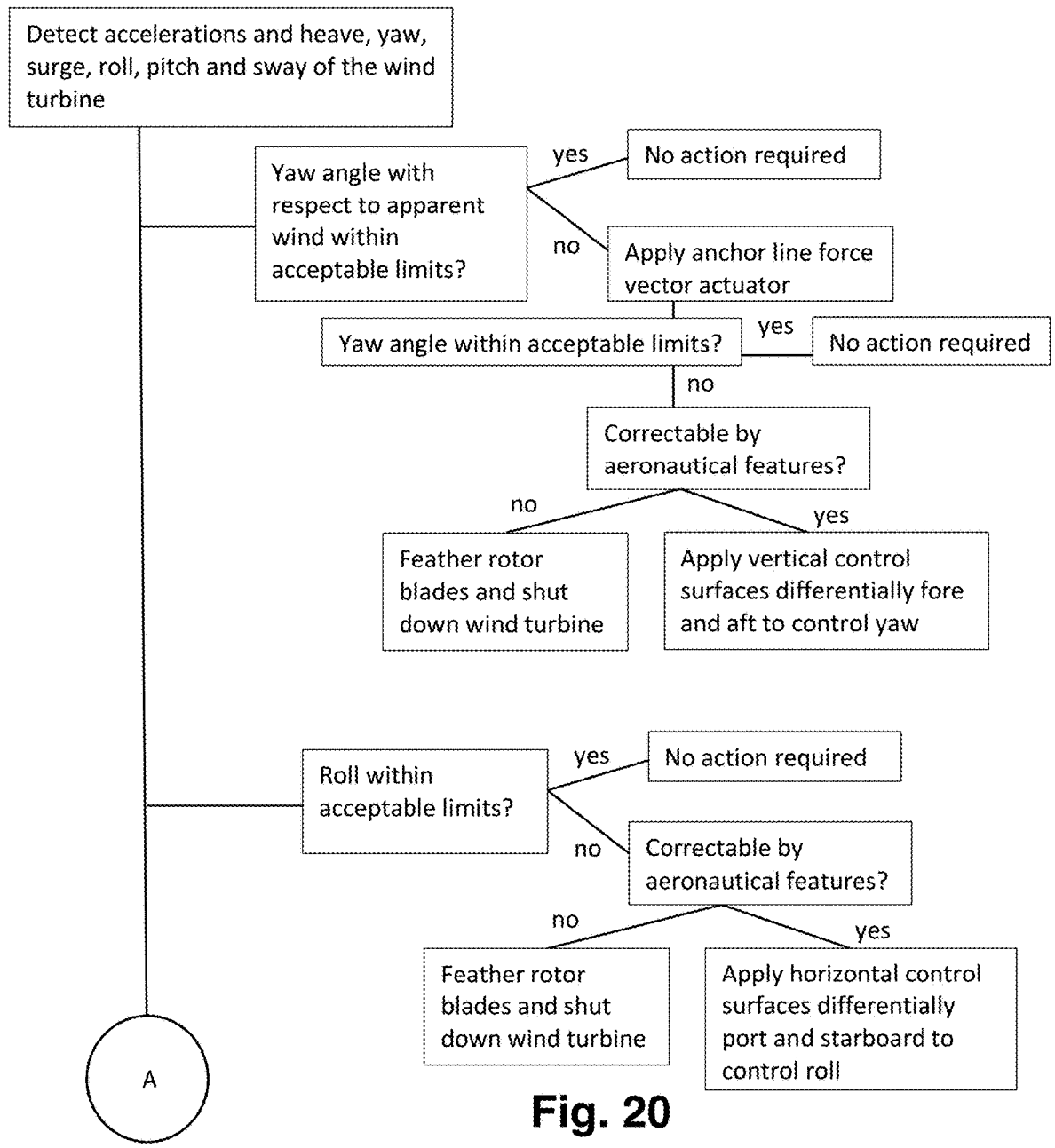
Figure 21:
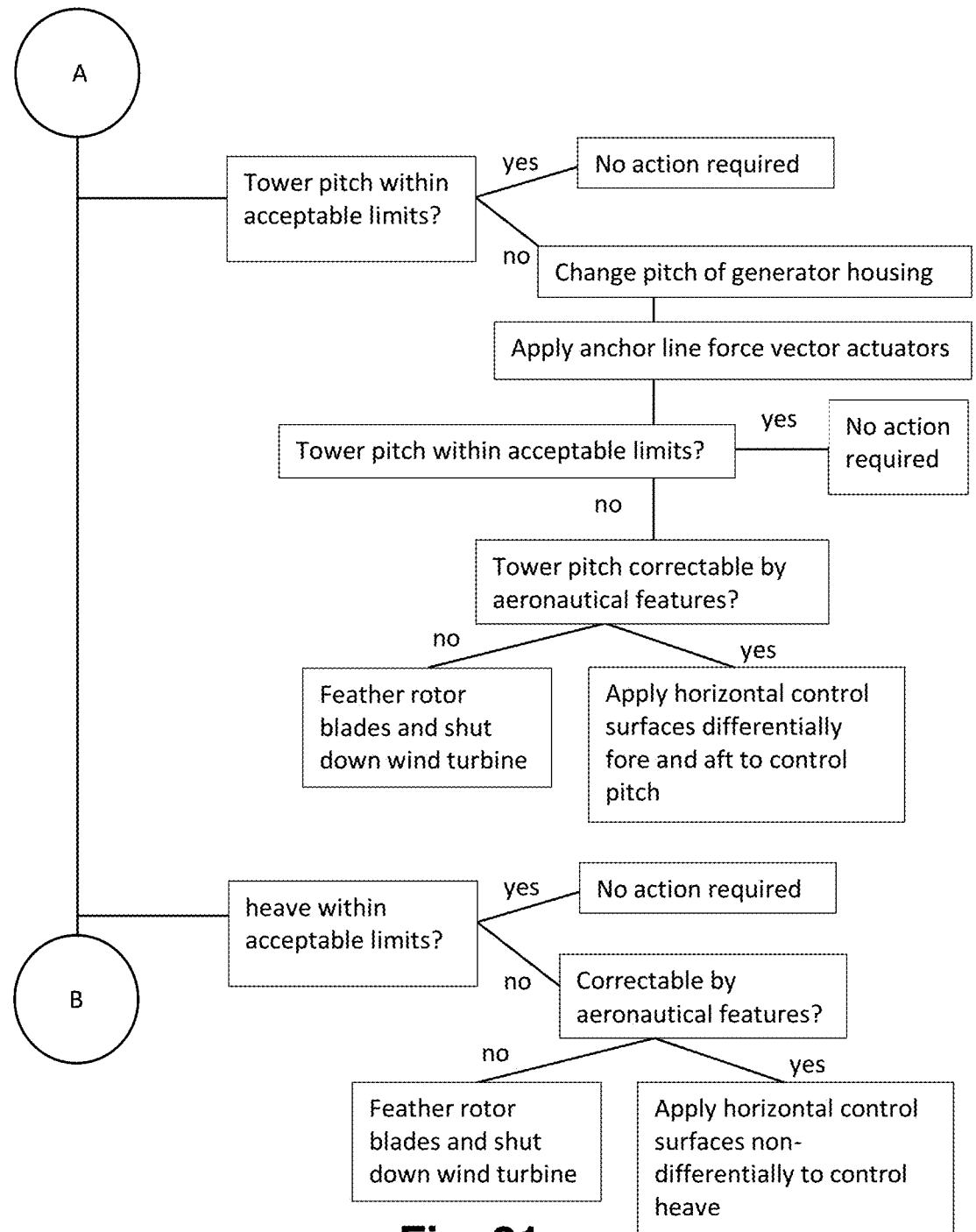
Figure 22:
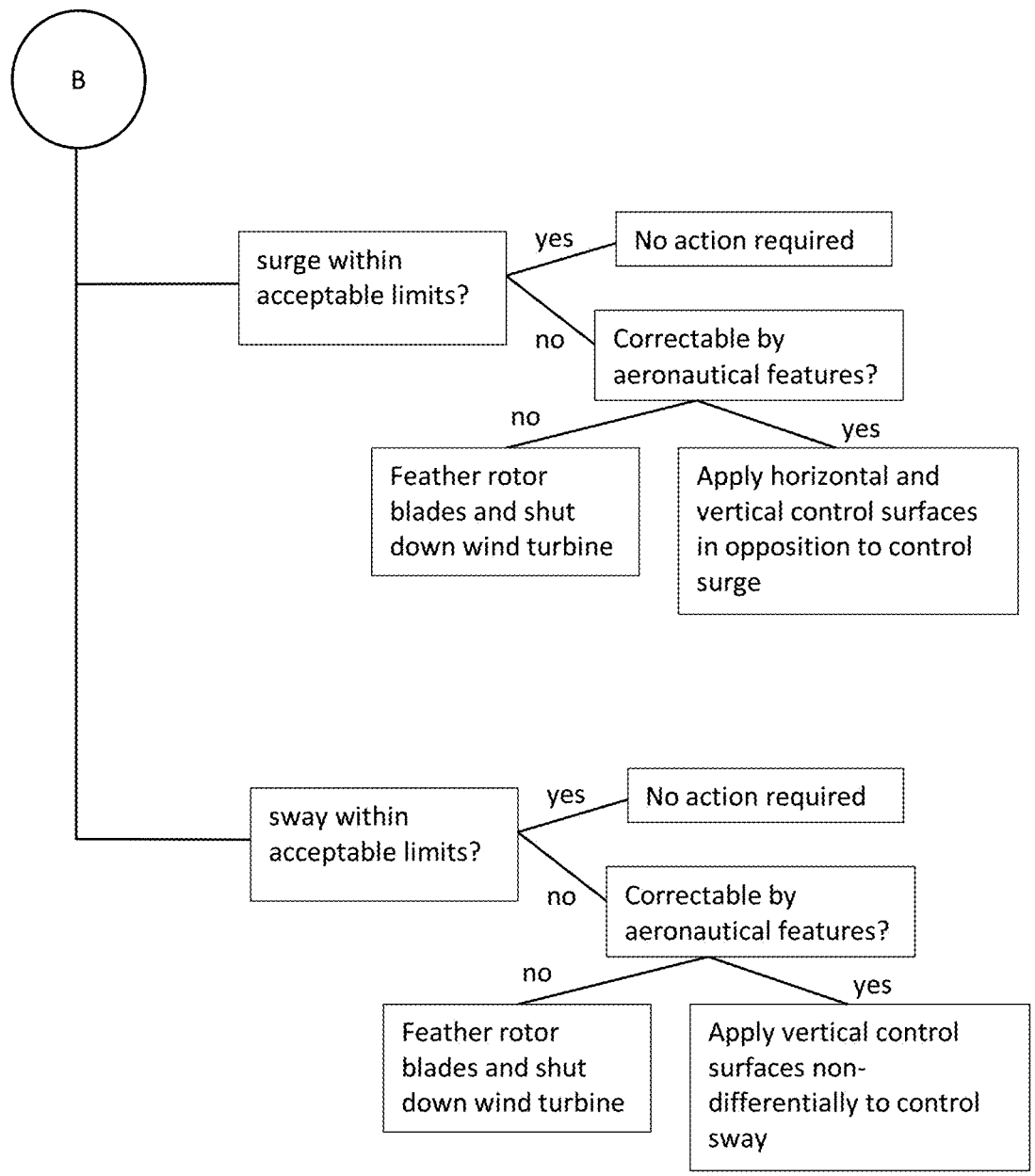

FIGS. 20, 21 and 22 comprise a single flow chart of the actions of the control system using the vertical and horizontal control surfaces control the motion of the wind turbine in six degrees of freedom.

IV. DESCRIPTION OF AN EMBODIMENT

Figure 1:
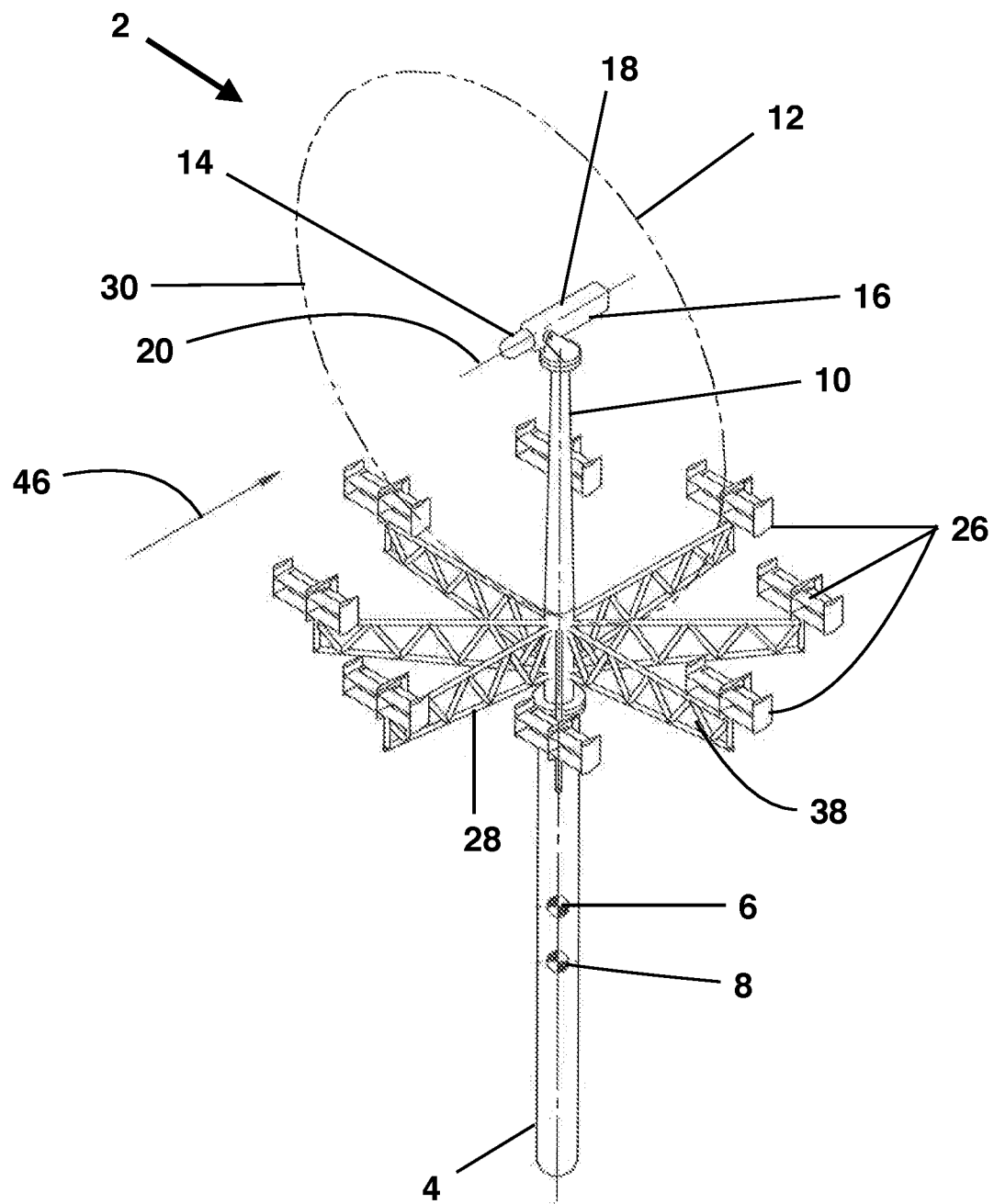
FIG. 1 is a perspective view of the floating offshore wind turbine having aerodynamic control surfaces.
Figure 2:
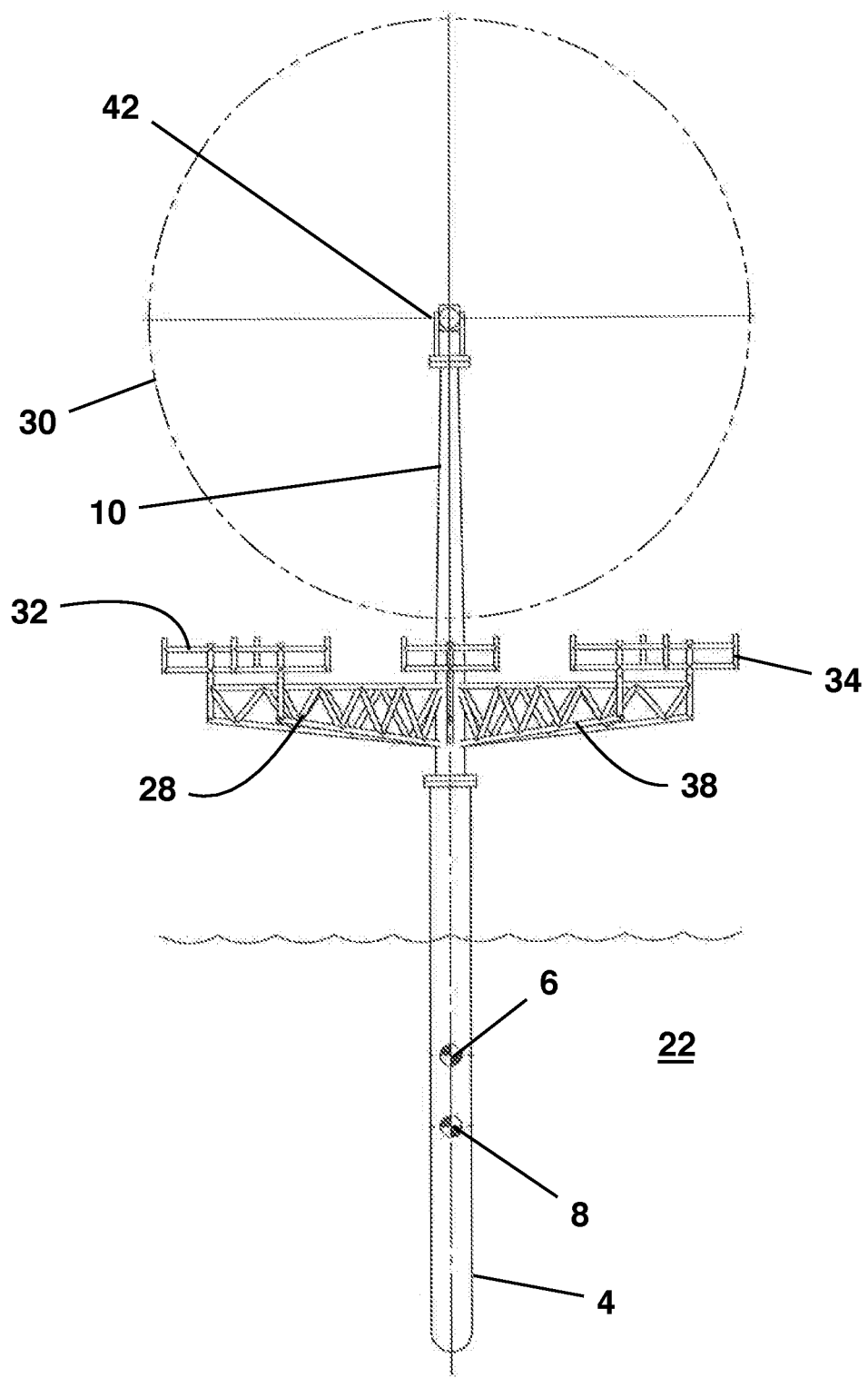
FIG. 2 is a front view of the wind turbine having aerodynamic control features.

FIG. 1 is a perspective view and FIG. 2 is a front view of an offshore floating wind turbine 2. The wind turbine 2 includes an elongated buoyant body 4. The buoyant body 4 defines a center of buoyancy 6. The center of gravity 8 of the wind turbine 2 is below the center of buoyancy 6, allowing the wind turbine 2 to float stably in an upright position. A tower 10 is supported by the buoyant body 4. The rotor 12, rotor hub 14 and generator 16 in a nacelle 18 are supported at the top of the tower 10. The rotor hub 14 has a horizontal axis of rotation 20. Rotor blades 24 are attached to the rotor hub 14 and rotate about the rotor axis of rotation 20. FIG. 1 shows the wind turbine 2 as being of the horizontal upwind type, but the wind turbine 2 also can be a horizontal downwind type or a vertical axis type.

From FIGS. 1 and 2, aerodynamic features 26 are supported in a spaced-apart relation to the tower 10 by a support structure 38. The support structure 38 may define a truss and defines openings to allow air to pass through the structure. The support structure 38 may be composed of an open lattice 28. As shown by FIGS. 1 and 2, a plurality, for example eight, aerodynamic features 26 may be distributed radially about the tower 10 at a location above the water 22 splash height but below the rotor disc 30.

Figure 3:
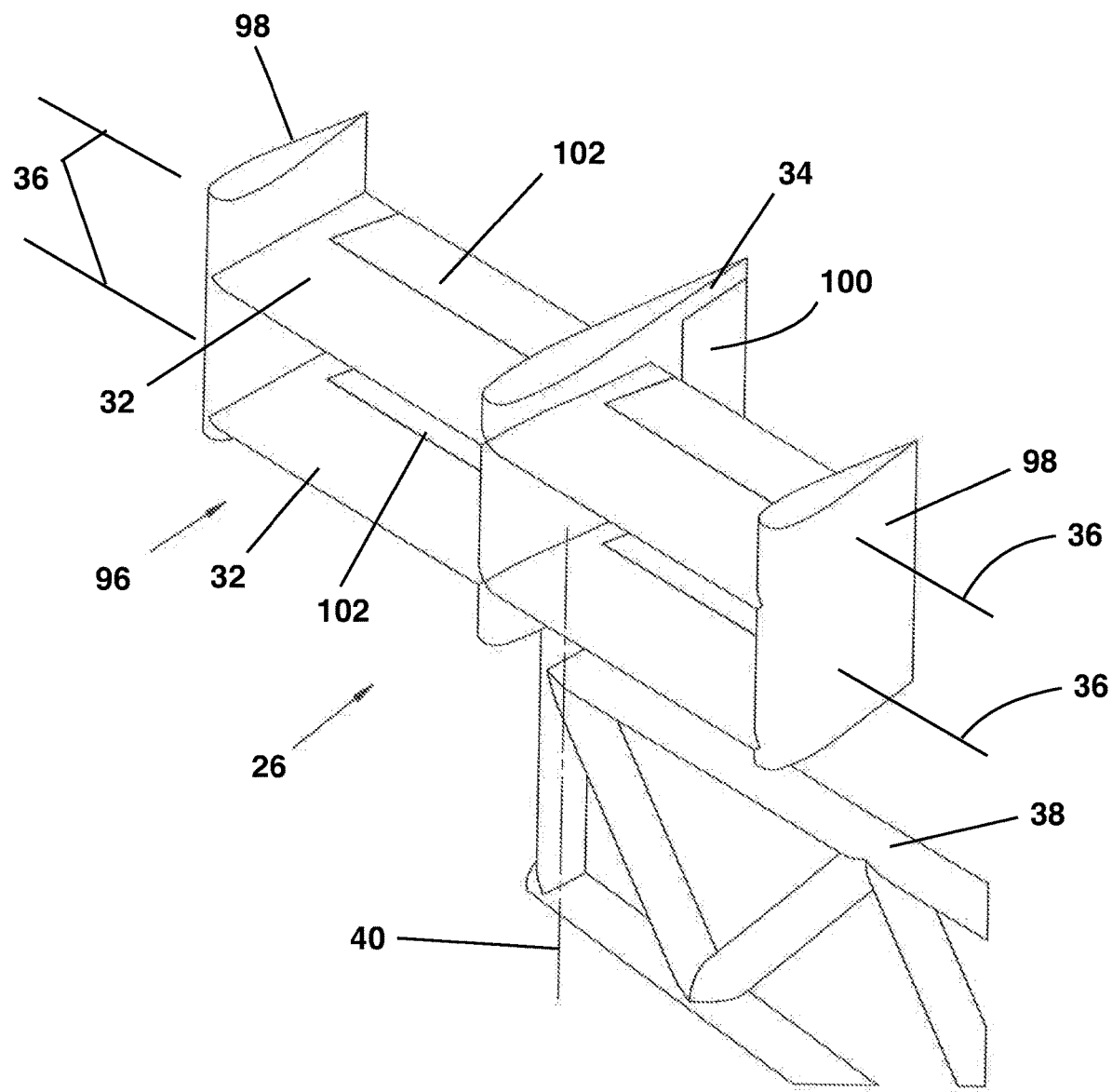
FIG. 3 is a detail perspective view of an aerodynamic control feature.
Figure 4:
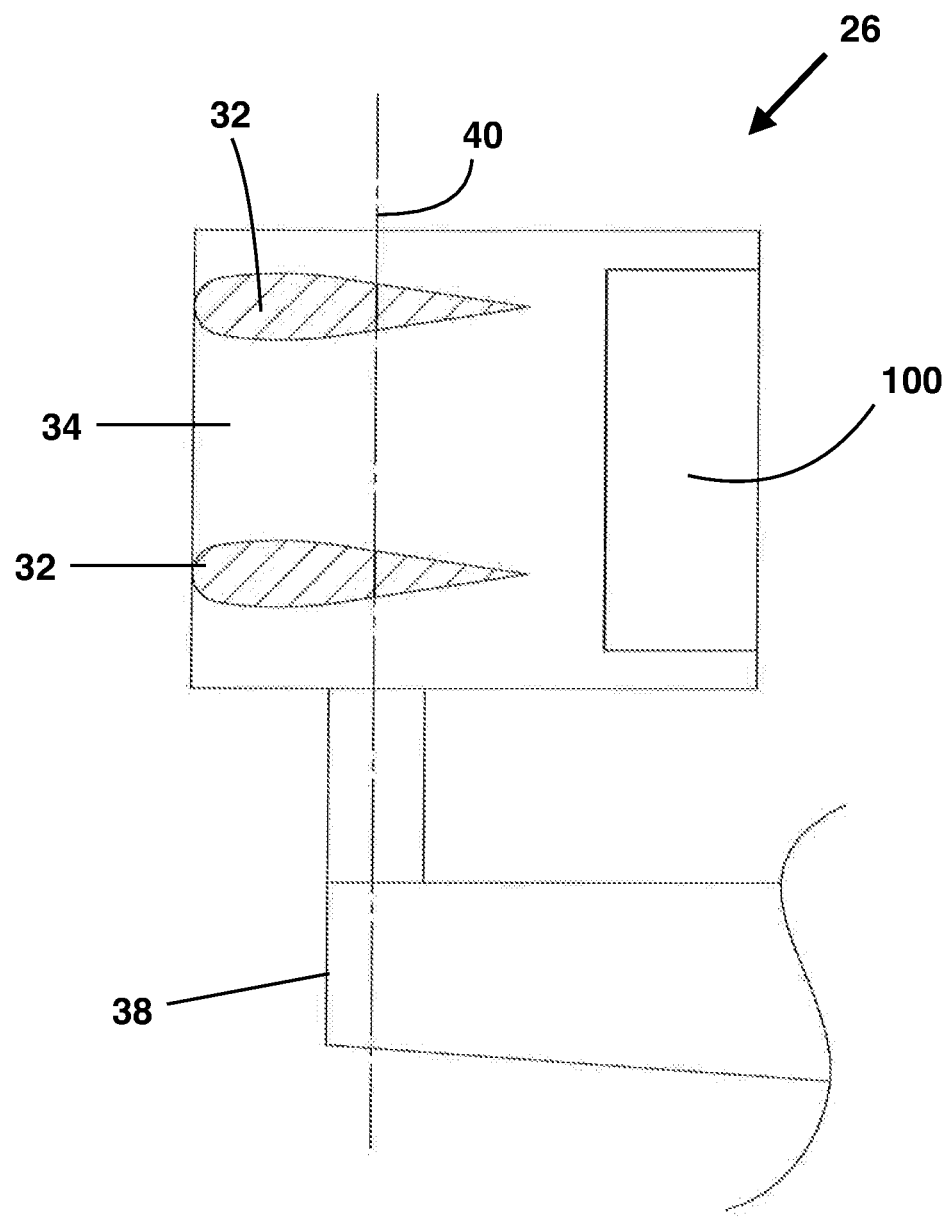
FIG. 4 is a detail side view of an aerodynamic control feature.

FIGS. 3 and 4 are perspective and side views of the aerodynamic features 26. The aerodynamic features 26 may be in the form of a box wing 96 and may comprise horizontal control surfaces 32, vertical control surfaces 34 or both horizontal 32 and vertical control surfaces 34. The vertical control surfaces 34 may include extensions 98 to the box wing 96 that extend above the horizontal control surfaces 32. The horizontal control surfaces 32 may be attached to and may turn with a vertical control surface 34 about a vertical axis 40 under the control of the control system.

The horizontal control surfaces 32 are in the shape of one or more airfoils. The airfoils are analogous to the horizontal stabilizers of an aircraft. Each of the horizontal control surface 32 airfoils may be independently rotatable about a horizontal axis 36 under the control of a control system to control the angle of attack of the airfoils with respect to the moving air. Depending on the selected angle of attack, a horizontal control surface 32 may apply either an upward or a downward force on the support structure 38 to which the horizontal control surface 32 is mounted. The horizontal control surfaces 32 in combination may apply heeling or righting moments in any direction to the wind turbine 2. The horizontal control surfaces 32 may be attached to and supported by the vertical control surfaces 34. Each horizontal control surface 32 may have a trailing edge flap 102 to provide the control system with an option for less horizontal control power and better resolution than is provided by rotating an entire horizontal control surface 32 about a horizontal axis 36. Each of the horizontal control surface trailing edge flaps 102 may be moved by the control system independently from the other horizontal control surface trailing edge flaps 102.

Each vertical control surfaces 34 is comparable to the vertical stabilizer of an aircraft. The vertical control surfaces 34 and the attached horizontal control surfaces 32 may be movable together about a vertical axis 40 under the control of the control system. The vertical control surfaces 34 selectably may apply lateral forces to the tower 10 and hence to the wind turbine 2. The control system may select differential positions for the vertical control surfaces 34. Each vertical control surface 34 may have a trailing edge flap 100 to provide the control system an option for control with less control power and better resolution than is provided by rotating the entire vertical control surface 34 around the vertical axis of rotation 40.

By selecting vertical control surface positions that are deflected in opposite directions for vertical control surfaces 34 located on opposite sides of the tower 10 in the upwind and downwind directions, the control system can apply a yawing moment to the wind turbine 2. By selecting vertical control surface positions that are deflected in the same direction, the control system can apply translational forces to the wind turbine 2 and may move the entire wind turbine 2 left or right around the anchor. In deep water 22 with a long anchor line 66, the control system may be able to steer the wind turbine 2 to; for example, move the wind turbine 2 out of the way of a passing ship or an approaching storm, avoiding damage and increasing the capacity factor of the wind turbine 2.

The combination of the horizontal 32 and vertical control surfaces 34 under active control allows the control system to apply forces to the wind turbine 2 in all six degrees of freedom of a floating body to improve the stability of the wind turbine 2, to counteract perturbations such as wind gusts and waves, and to actively steer the wind turbine 2.

The combination of the horizontal and vertical control surfaces 32, 34 under active control also may allow a horizontal upwind wind turbine 2 design with a single anchor line 66 attachment location, shown by FIGS. 1 and 2. The horizontal upwind wind turbine 2 design has the advantage that the rotor 12 is not shielded from the wind by the tower 10 for a portion of each revolution of the rotor 12, increasing the efficiency of the wind turbine 2.

Figure 5:
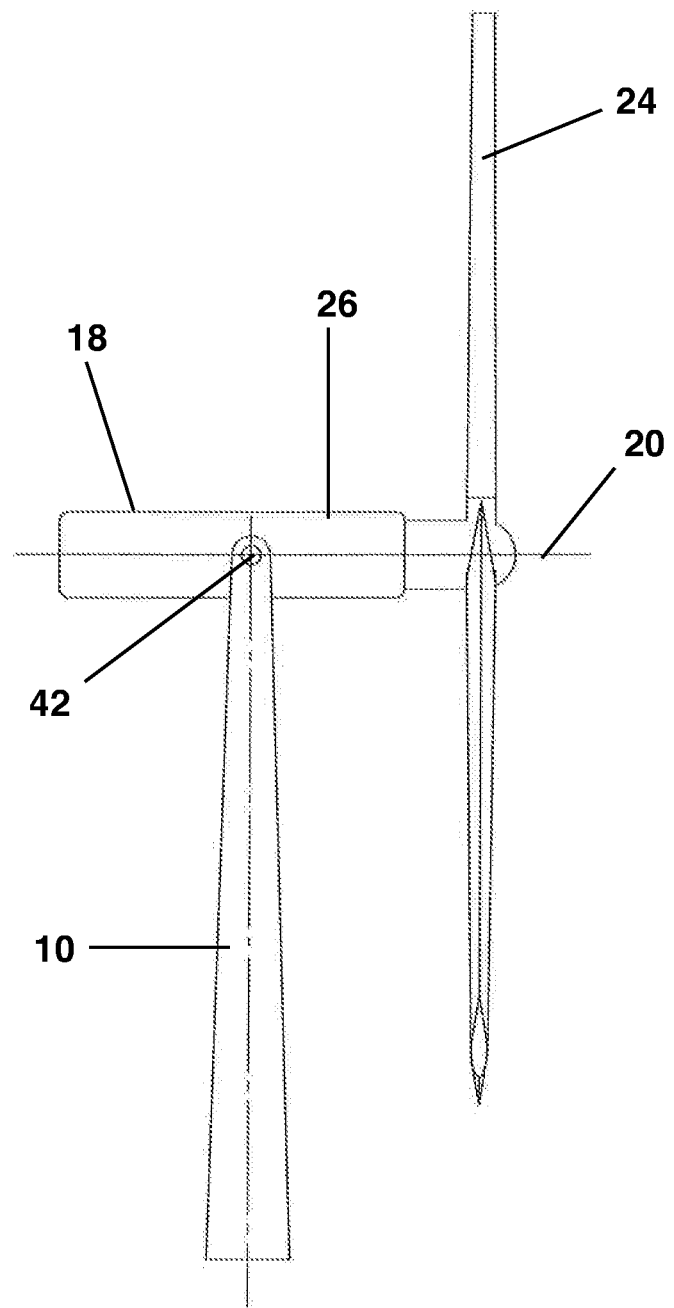
FIG. 5 is a side view of the turbine nacelle, hub and rotor tiltable about a horizontal axis.

FIG. 5 shows the top of the tower 10, the rotor hub 14, the rotor blades 24, and the nacelle 18. The nacelle 18 is tiltable about a hinge 42 that is transverse to the axis of rotation of the rotor 12. The nacelle 18, and hence the generator 16, generator axis of rotation 20, rotor hub 14 and rotor 12, may be tilted about the hinge 42 under the active control of the control system. Any mechanism known in the art may be used to tilt the nacelle 18, including one or more hydraulic cylinders 60 acting on the nacelle 18, or one or more electric or hydraulic motors turning a capstan to move cables to tilt the nacelle 18, or one or more electrical or hydraulic motors turning a pinion 74 to move a rack 72 to tilt the nacelle 18, or any other mechanism mentioned in this document for moving one object with respect to another or known in the art.

The control system may tilt the nacelle 18 of FIG. 5 to compensate for heel of the tower 10 as a result of wind and water motions. Tilting the nacelle 18 prevents tower 10 strikes by the moving rotor blades 24 and exposes the full rotor disc 30 to the wind, increasing the capacity factor of the wind turbine 2.

FIGS. 6 through 16 address systems to use the vertical component 50 of the anchor line force vector 44 to reduce wind turbine 2 heel caused by wind and water 22.

Figure 6:
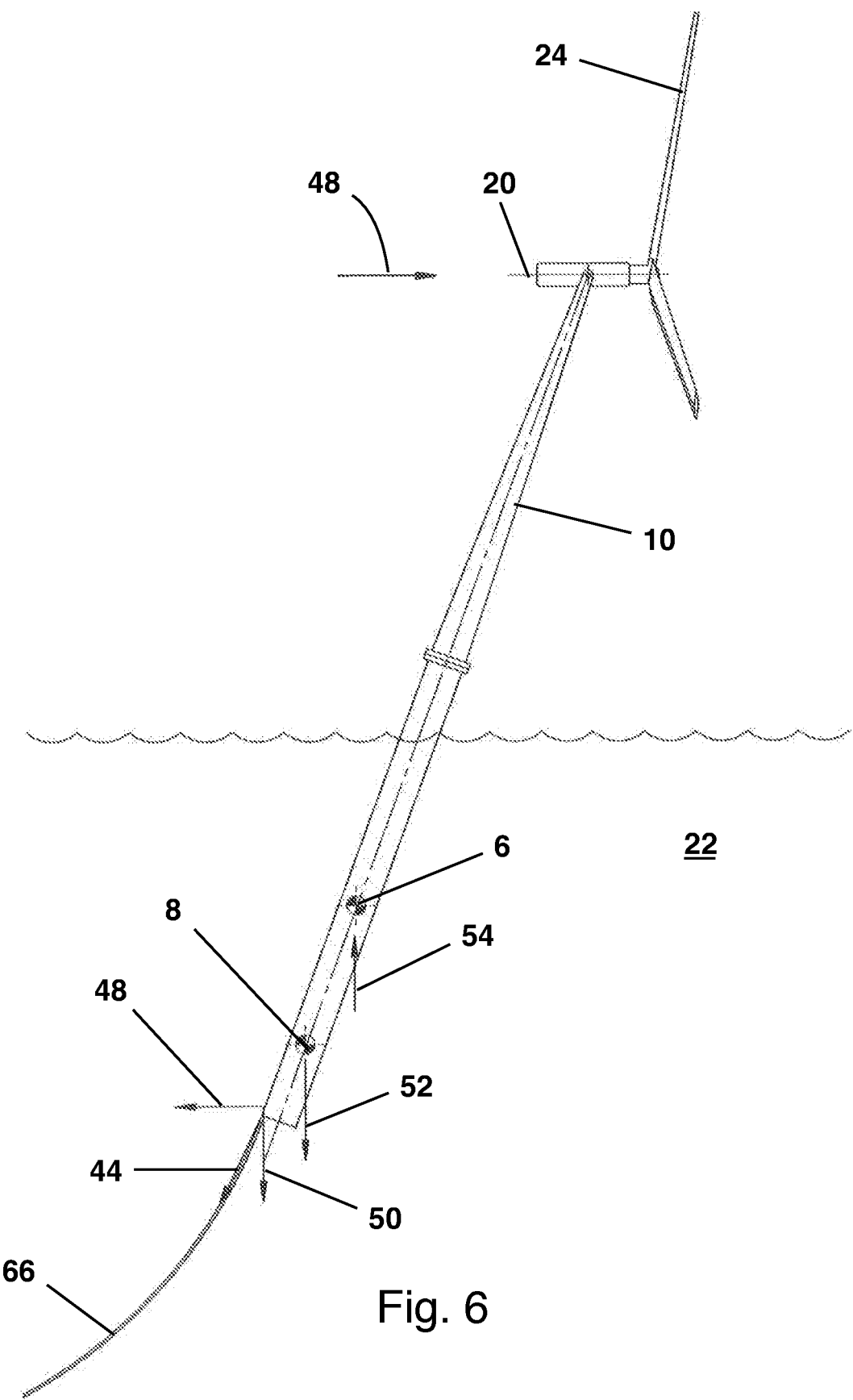
FIG. 6 is a schematic diagram of heeling, righting, and anchor line vector moments.

FIG. 6 illustrates the heeling and righting forces acting on the floating wind turbine 2. The sum of the forces of wind 46 and water 22 pushing on the tower 10, nacelle 18 and rotor 12 applies a heeling moment to the wind turbine 2 tending to push the wind turbine 2 over. The horizontal component 48 of the anchor line force vector 44 is equal and opposite to the sum of the forces of wind and water 22 and, if the anchor line 66 is attached below the centers of buoyancy and gravity, also applies a heeling moment tending to push the wind turbine 2 over FIG. 6 also illustrates righting moments on the wind turbine 2 tending to keep the wind turbine 2 upright. The weight 52 of the wind turbine 2 acting through the center of gravity 8 pulls the wind turbine 2 downward. The vertical portion 50 of the anchor line force vector 44 also pulls the wind turbine 2 downward. The buoyancy force vector 54 acting through the center of buoyancy 6 is equal to the sum of the weight 52 of the wind turbine 2 plus the vertical portion of the anchor line force vector 44. As the wind turbine 2 heels, the centers of buoyancy and gravity separate horizontally, which applies a righting moment to the wind turbine 2. As the wind turbine 2 heels, the vertical component 50 of the anchor line force vector 44 also moves horizontally farther from the center of buoyancy 6, which also applies a righting moment to the wind turbine 2.

The systems of FIGS. 7-16 operate by selectably moving the anchor line force vector 44 farther from the center of buoyancy 6 horizontally to increase the righting moment applied to the wind turbine 2 by the vertical component 50 of the anchor line force vector 44.

Figure 7:
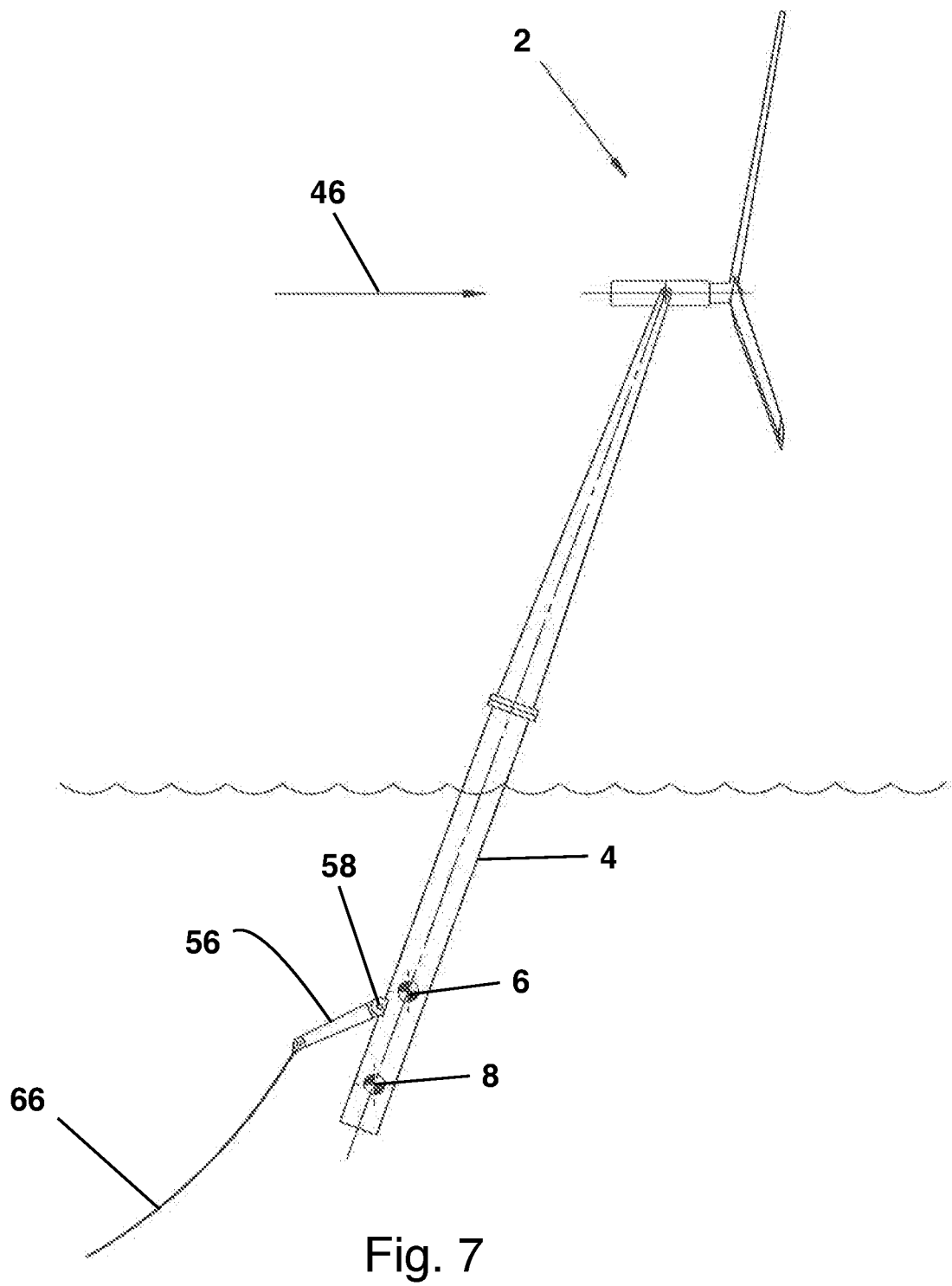
FIG. 7 is a side view of the floating turbine having a rotatable beam to change the anchor line force vector.
Figure 8:
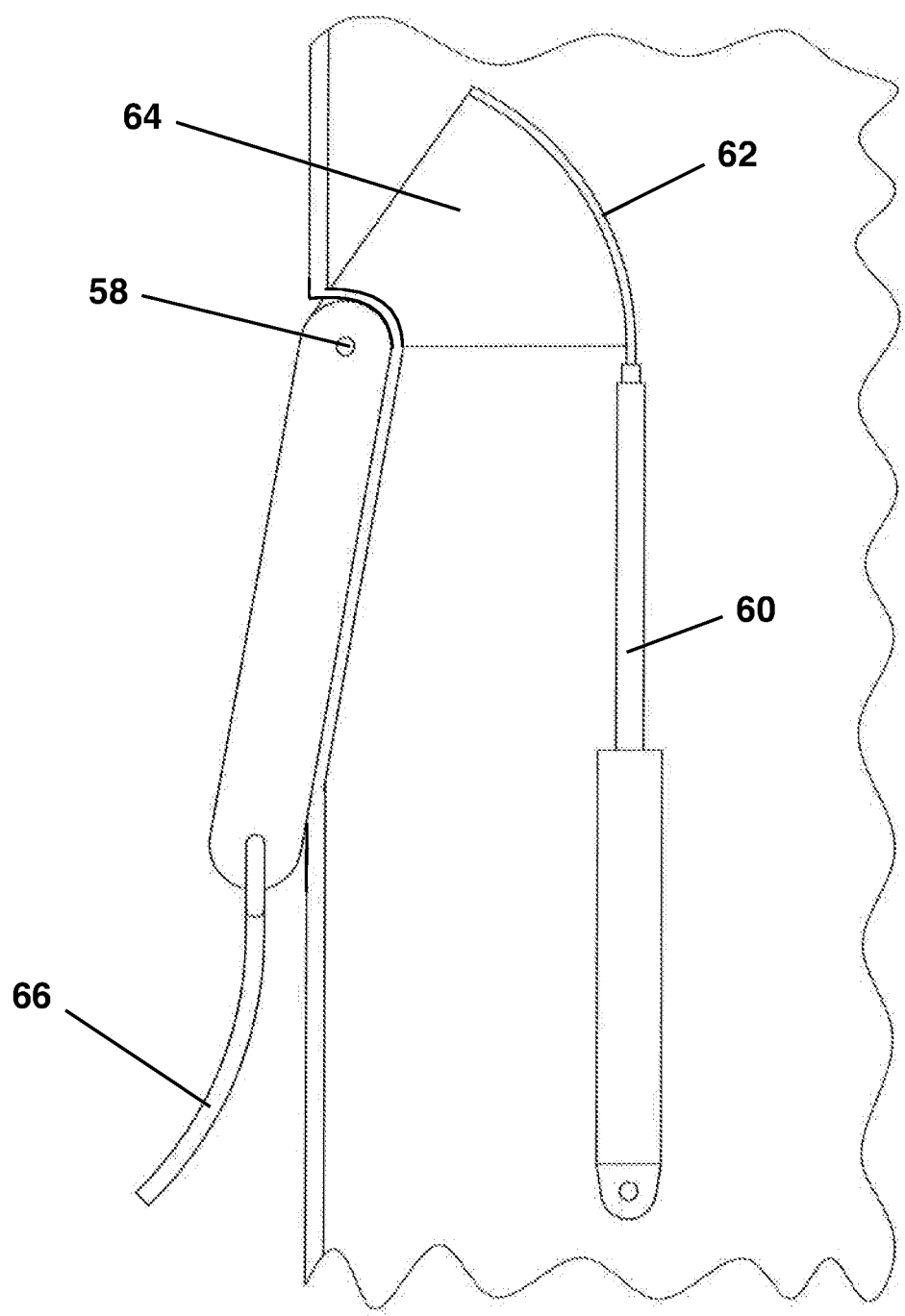
FIG. 8 is a side view of one embodiment of the rotatable beam.

FIGS. 7 and 8 show a rotatable beam 56 that connects the anchor line 66 to the buoyant body 4. The rotatable beam 56 is attached to the buoyant body 4 by a pin connection 58 and is rotatable about the pin. FIG. 8 shows the rotatable beam 56 in a first, or folded condition. FIG. 7 shows the rotatable beam 56 in a deployed condition, separating the vertical component 50 of the anchor line force vector 44 horizontally from the center of buoyancy 6. FIG. 8 shows one of many mechanisms that may be used to rotate the beam about the pin connection 58. FIG. 8 is a section view through the buoyant body 4. In FIG. 8, a hydraulic cylinder 60 pulls a cable, chain, rope or other flexible member 62 capable of transmitting force in tension over a shaped cam 64. The shaped cam 64 is attached to the rotatable beam 56 and moves the beam between the folded and deployed conditions. The control system locks the beam 56 in the deployed condition. When conditions warrant, the control system releases the rotatable beam 56 and the weight of the beam 56 and anchor line 66 returns the beam 56 to the folded condition.

As alternatives to the hydraulic cylinder 60 and cam of FIG. 8, electrical or hydraulic motors, pneumatic cylinders, gears, gear trains, racks and pinions, lead screws, jack screws, cables on a drum or capstan, one or more wedges, one or more levers, or any other technique for moving one object with respect to another may be used to move the rotatable beam between the folded and deployed conditions.

Figure 9:
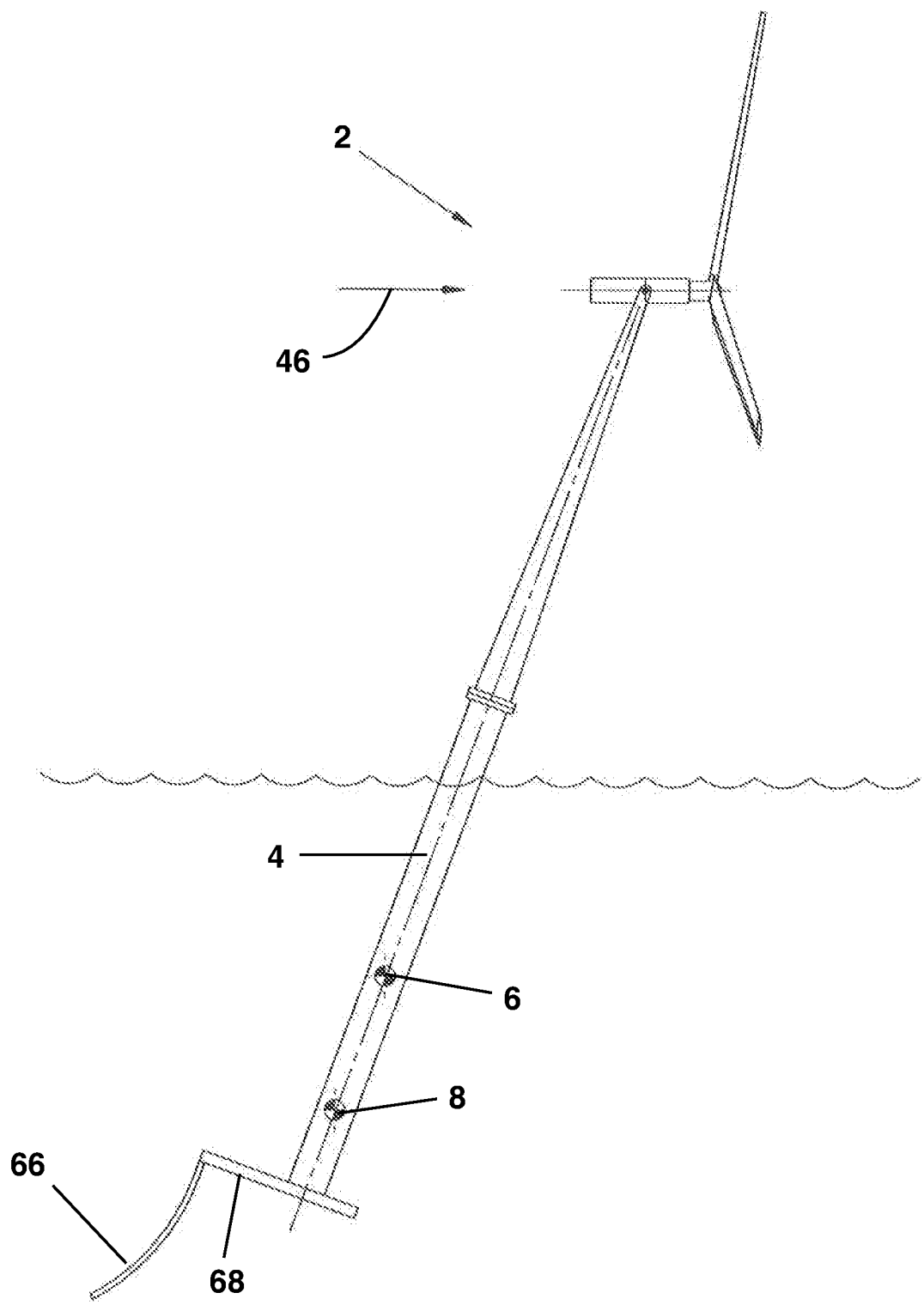
FIG. 9 is a side view of the floating wind turbine having a sliding beam to move the anchor line force vector.
Figure 10:
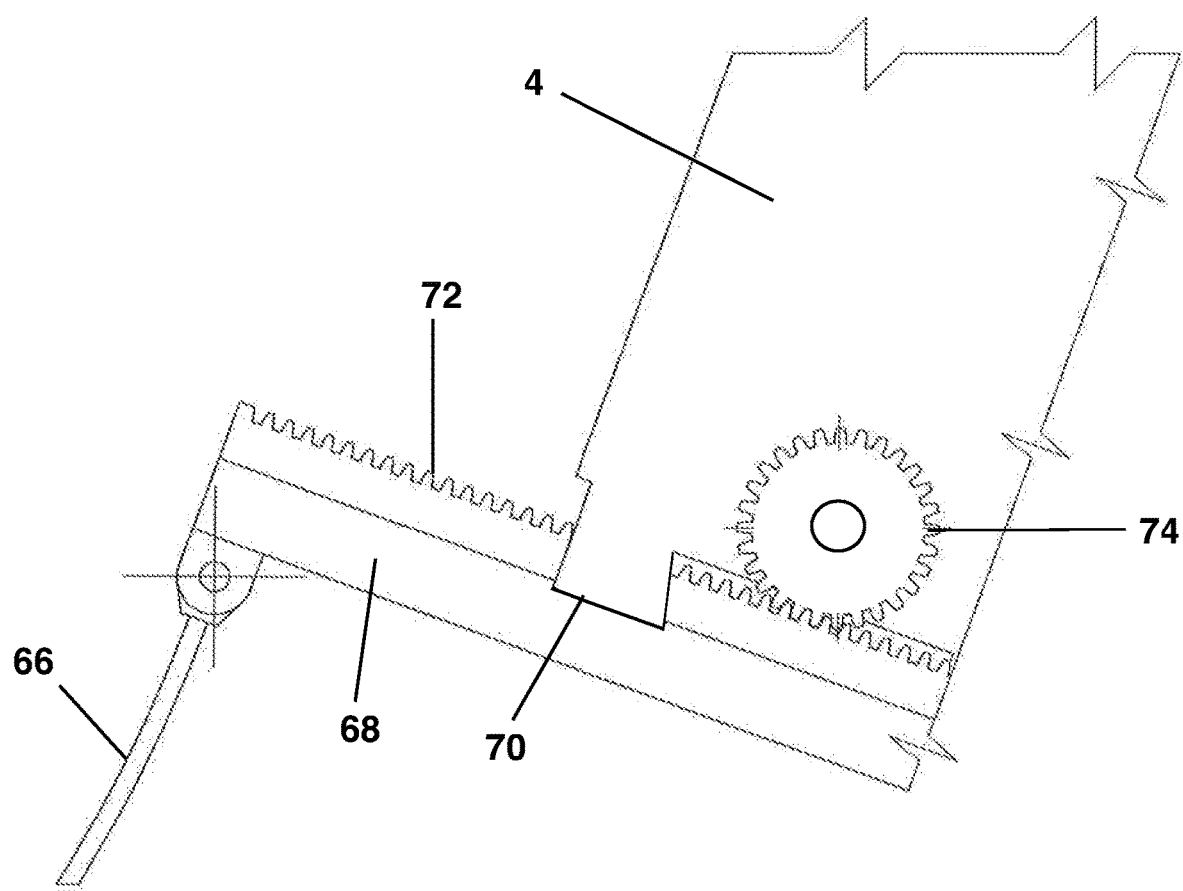
FIG. 10 is a detail side view of the sliding beam having a rack and pinion.

FIGS. 9 and 10 illustrate an extendable beam 68 to move the anchor attachment location and hence the vertical component 50 of the anchor line force vector 44 with respect the center of buoyancy 6. In the system of FIGS. 9 and 10, the extendable beam 68 slides on a track 70 either attached to or enclosed within the buoyant body 4. In the example of FIG. 10, the extendable beam 68 defines a rack 72. A pinion 74 engages the rack 72 and selectably moves the extendable beam 68, and hence the anchor line 66 attachment location, either closer to or farther away from the center of buoyancy 6 in the horizontal direction. While FIG. 10 uses the example of a rack 72 and pinion 74 to move the extendable beam 68, any of the other mechanisms discussed in this document or known in the art of moving one object with respect to another may be used.

Figure 11:
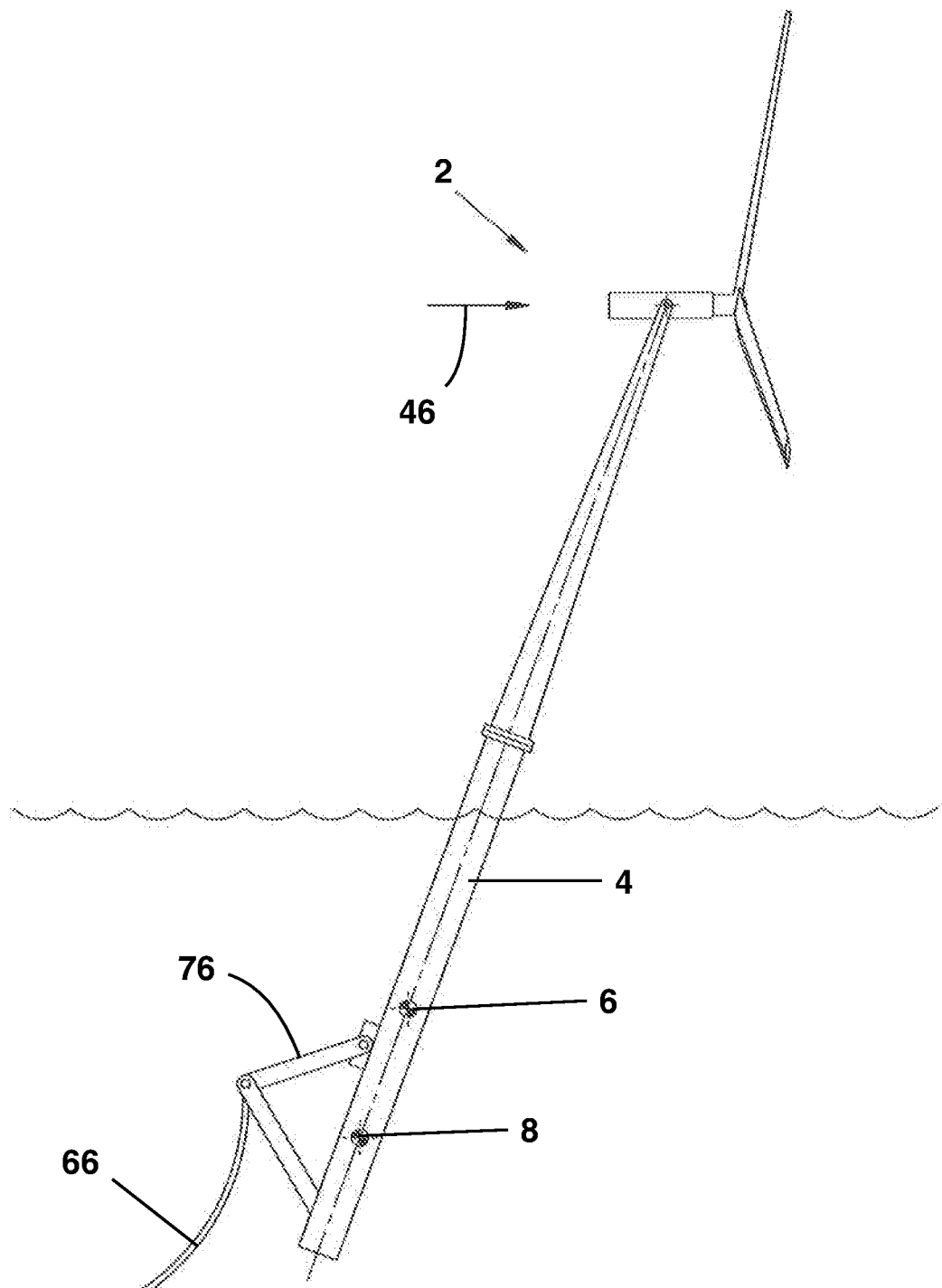
FIG. 11 is a side view of the floating wind turbine having an articulated knee.
Figure 12:
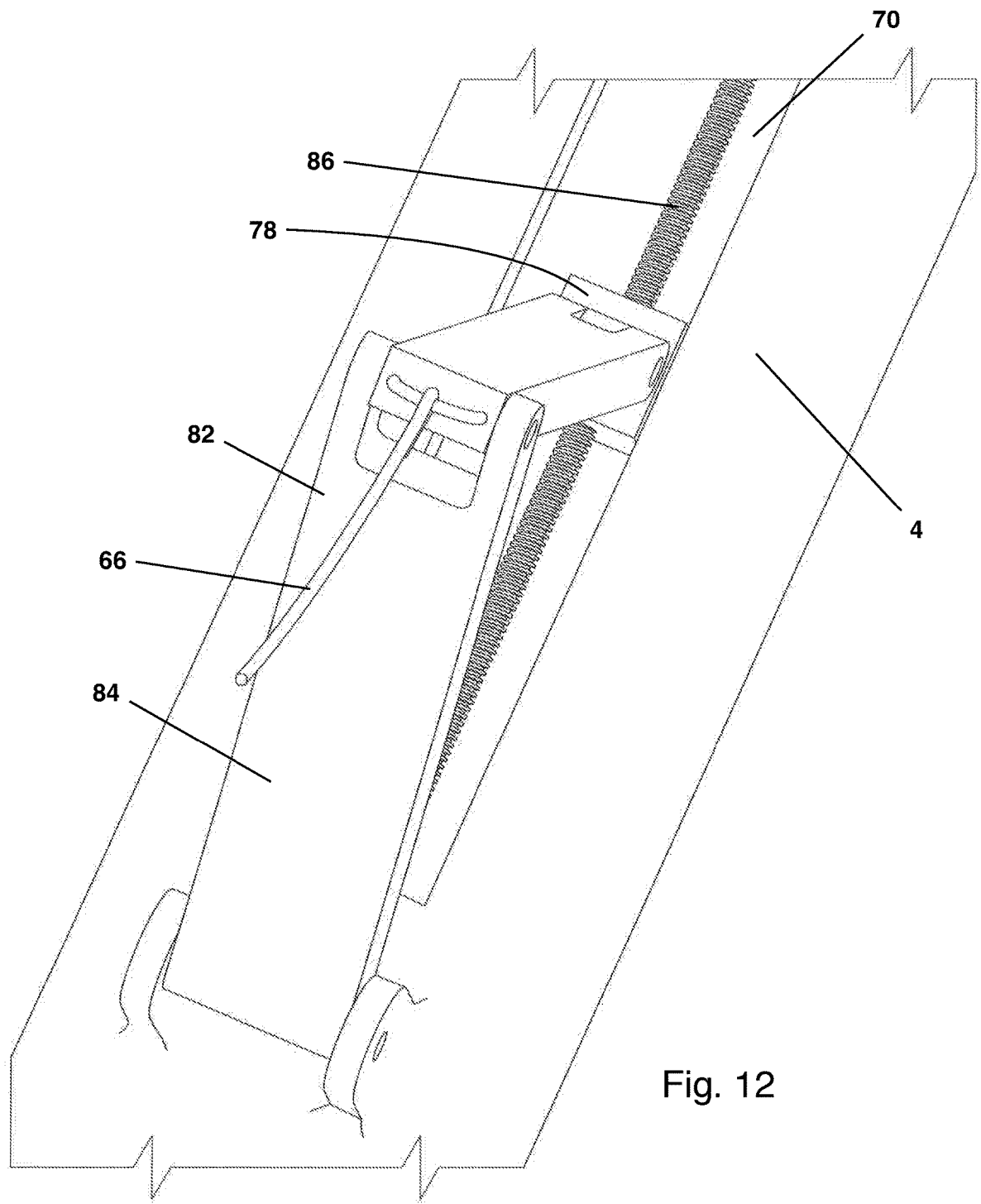
FIG. 12 is a detail perspective view of the knee.

FIGS. 11 and 12 show an extendable knee 76 having two links 82, 84 for selectably moving the anchor line force vector 44 with respect to the center of buoyancy 6. A slider 78 moves in a track 70 vertically on the buoyant body 4. The slider 78 has a pinned connection to a first link 82. A second link 84 has a pinned connection to the buoyant body 4 and to the first link 82. Both links 82, 84 rotate about the pinned connections. The anchor line 66 is attached at the junction of the first and second links 82, 84. A lead screw 86 selectably moves the slider 78 in the track 70 between an extended position, shown by FIGS. 11 and 12, and a folded position in which the anchor line 66 attachment is close to the buoyant body 4. As noted for the other embodiments, any mechanism discussed in this document or any suitable mechanism known in the art of moving one object with respect to another may be used may be used to move the slider 78 along the track 70.

Figure 13:
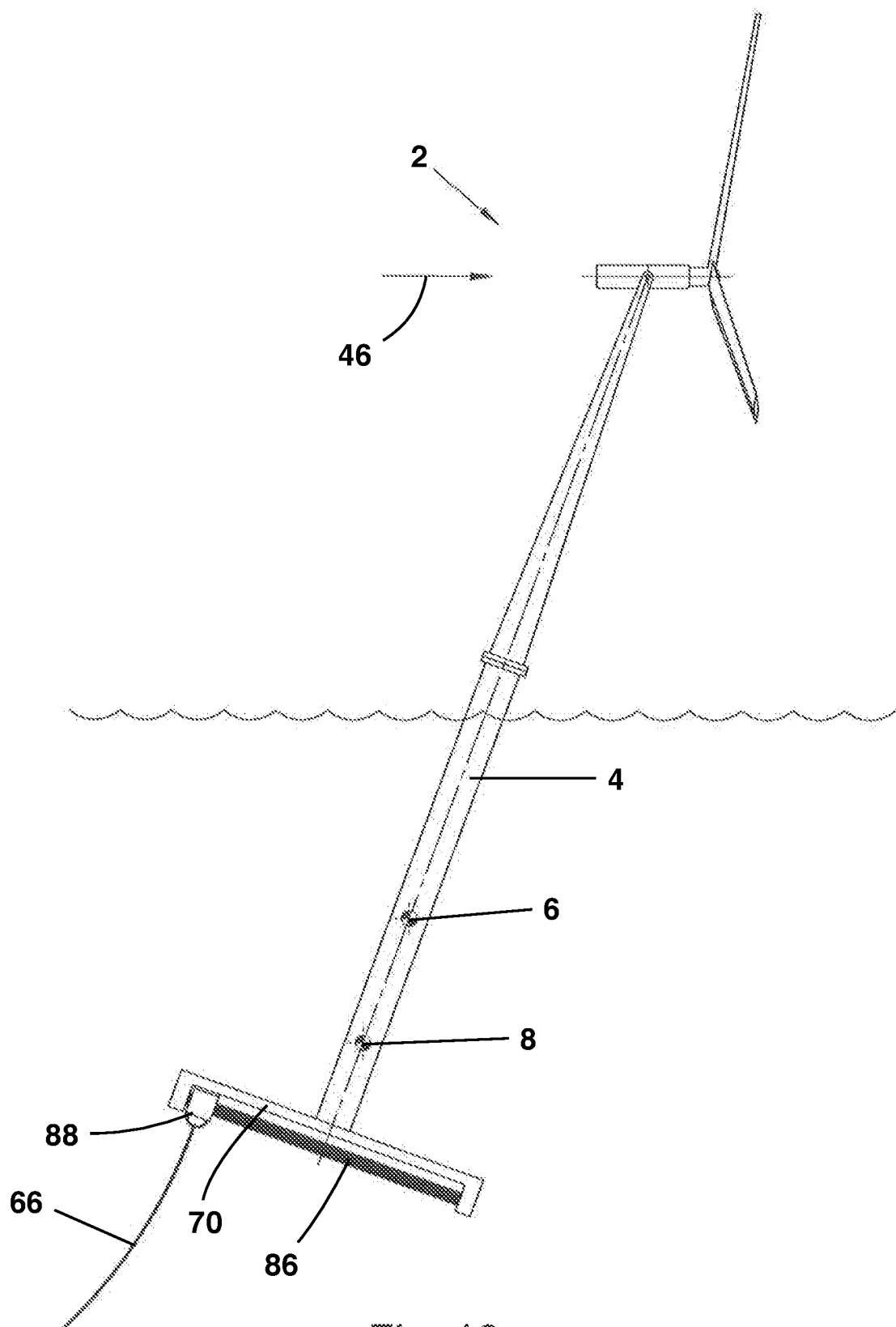
FIG. 13 is a side view of a floating wind turbine having a shuttle to move the anchor line force vector.
Figure 14:
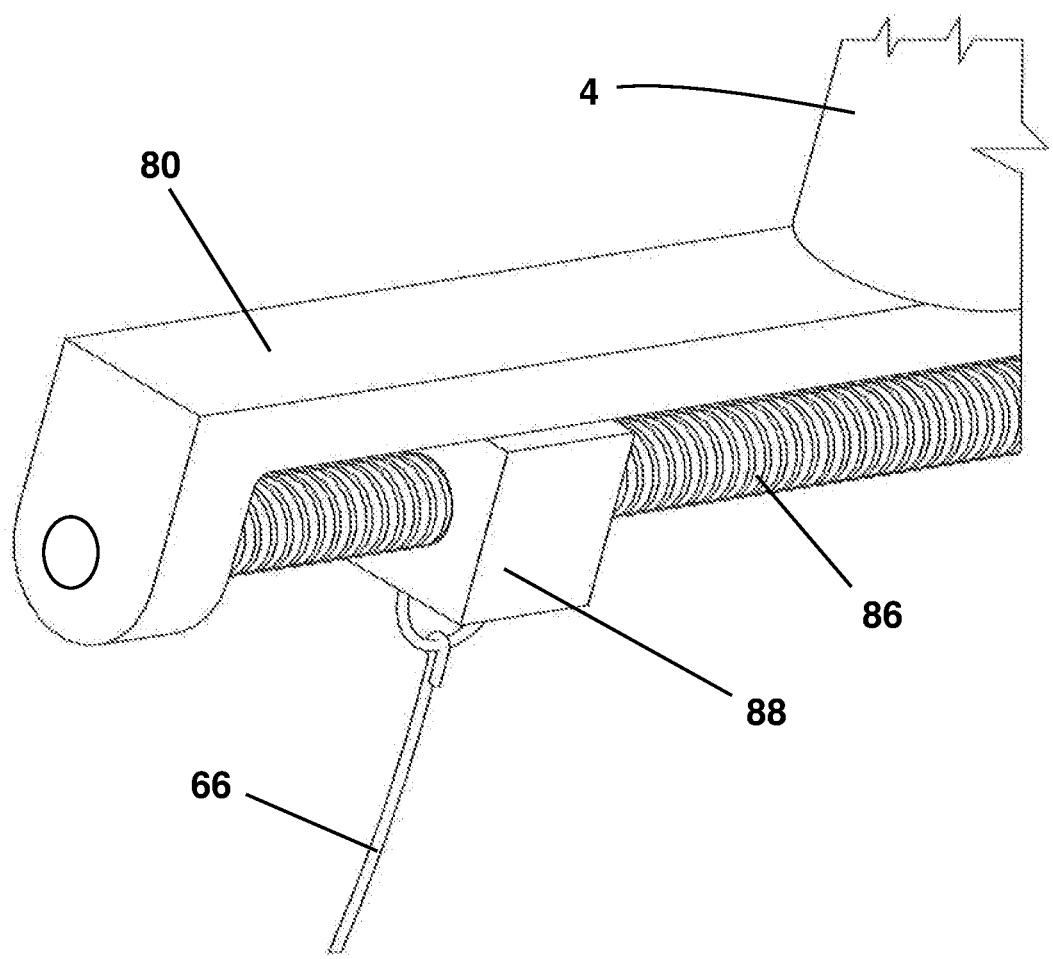
FIG. 14 is a detail view of the shuttle of FIG. 13.

FIGS. 13 and 14 show a shuttle 88 that is movable along a track 70 for selectably moving the anchor line force vector 44 with respect to the center of buoyancy 6. A track 70 is disposed on the buoyant body 4. A shuttle 88 is constrained to move along the track 70. The anchor line 66 is attached to the shuttle 88. In the example of FIG. 14, the shuttle 88 is moved by a lead screw 86; however, any technology discussed in this document or known in the art of moving one object with respect to another may be used to move the shuttle 88 along the track 70.

The shuttle 88 of FIGS. 13 and 14 is illustrated as moving horizontally. Alternatively, the track 70 may be vertically oriented (not shown) on the surface of the buoyant body 4. The vertically-oriented track 70 allows the shuttle 88 to move vertically and moves the anchor attachment location vertically with respect to the buoyant body 4 and hence with respect to the centers of buoyancy and gravity. As the shuttle 88 moves upward, the heeling moment applied by the horizontal component 48 of the anchor line force vector 44 reduces. When the shuttle 88 moves the anchor attachment location above the centers of gravity and buoyancy, the horizontal component 48 of the anchor line force vector 44 becomes a righting moment rather than a heeling moment.

Figure 15:
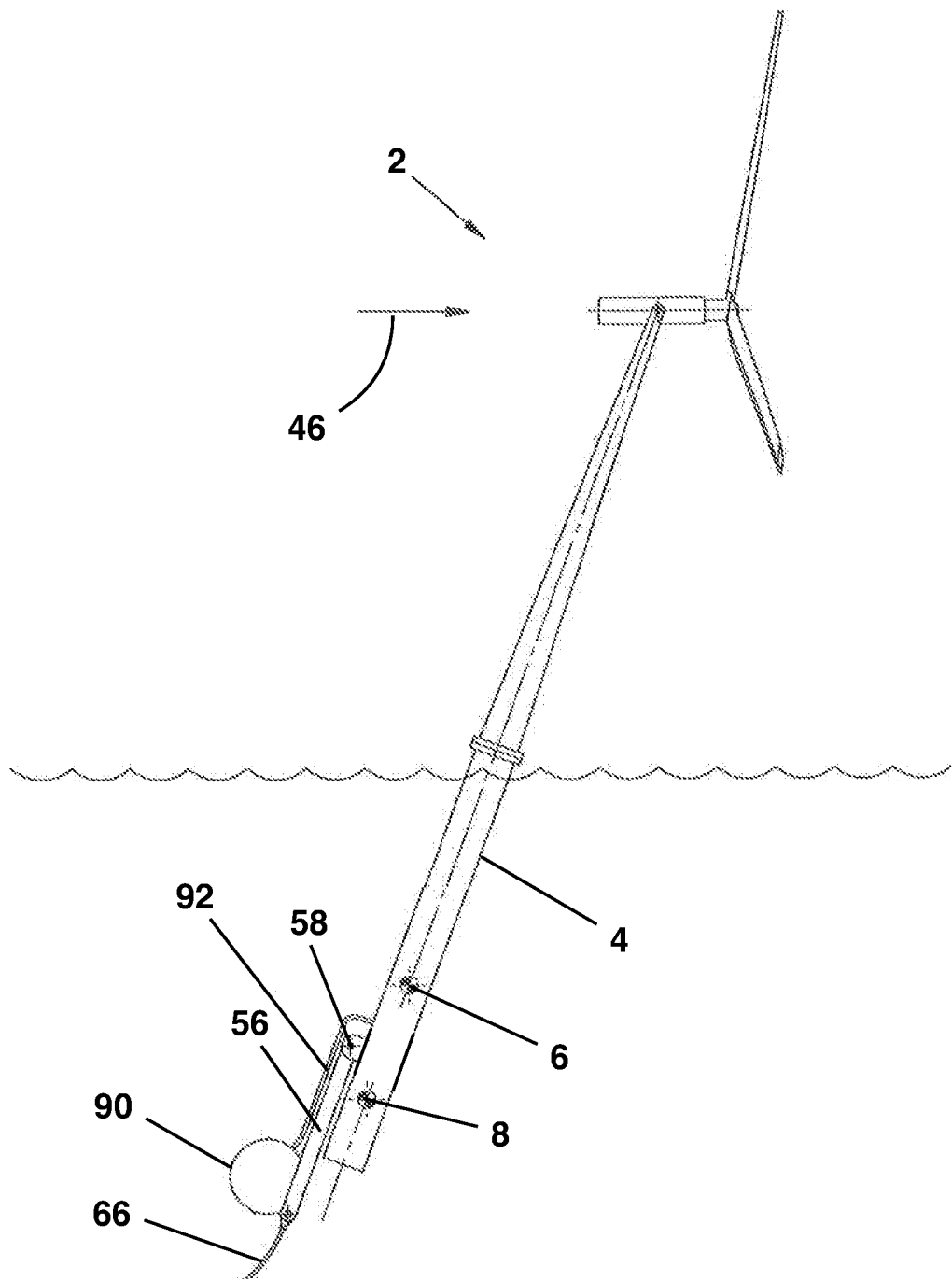
FIG. 15 is a side view of the floating wind turbine having a rotatable beam combined with a variable flotation body to move the anchor line force vector.
Figure 16:
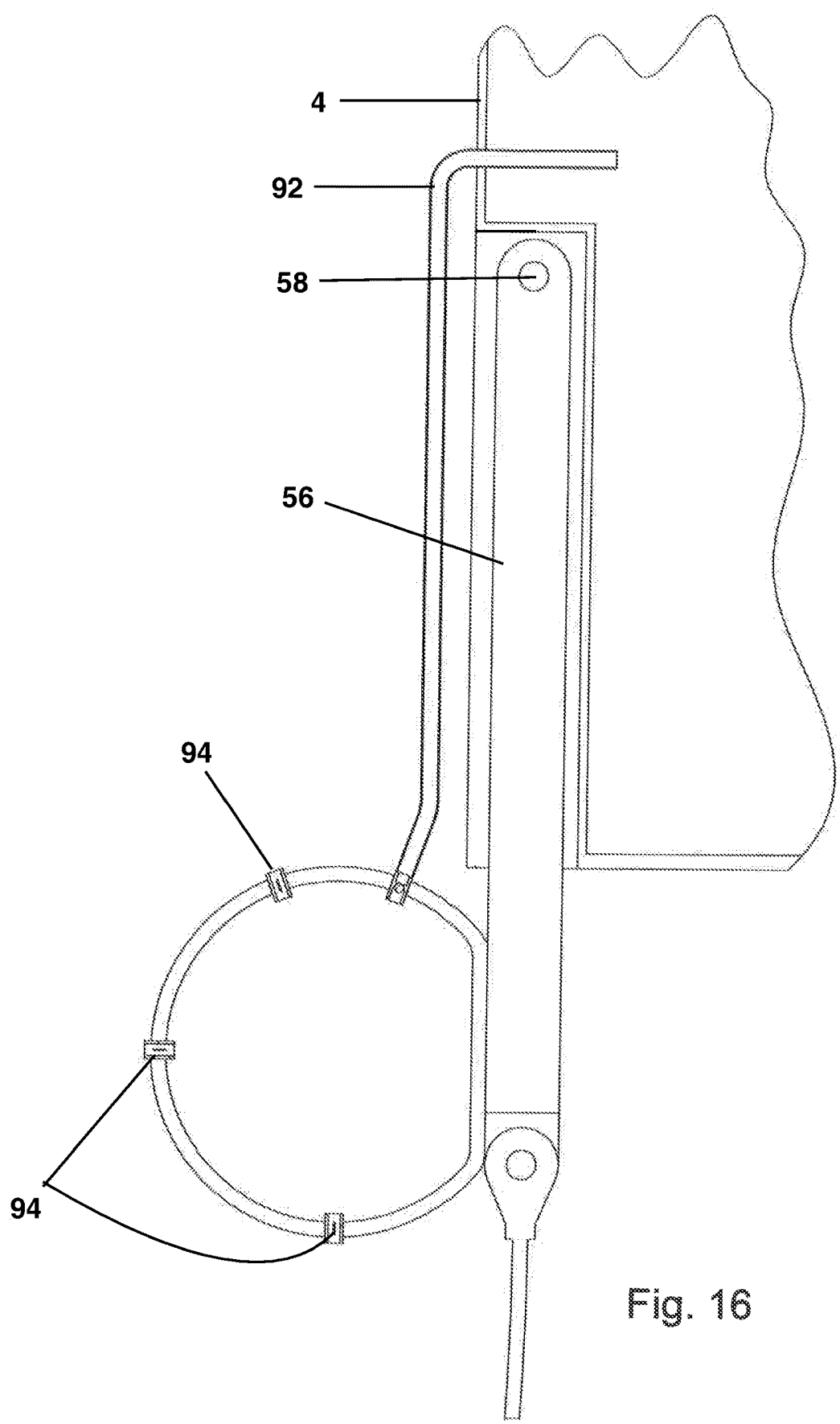
FIG. 16 is a detail cutaway view of the wind turbine with variable flotation body.

FIGS. 15 and 16 illustrate a rotatable beam 56 similar to that of FIGS. 7 and 8 above but with the addition of a variable flotation body 90 to move the rotatable beam 56 between the folded and deployed conditions. FIG. 16 is a section view through the variable flotation body 90 and the buoyant body 4. To move the rotatable beam 56 to the deployed condition, compressed air through a supply line 92 forces the water 22 from the variable flotation body 90. The volume of the now air-filled flotation 90 is selected to have adequate buoyancy to overcome the vertical component 50 of the anchor line force vector 44 and to support the weight of the rotatable beam 56. The rotatable beam 56 floats to the deployed position, shown by FIG. 7. The control system locks the rotatable beam 56 in the deployed position. The control system opens valves 94, flooding the variable flotation body 90. The vertical component 50 of the anchor line force vector 44 now applies an increased righting moment to the wind turbine 2.

The variable flotation body 90 of FIGS. 15 and 16 may be a supplement to the mechanism shown by FIGS. 7 and 8 or to any other mechanism for moving the rotatable beam 56 between the folded and deployed positions. The rotatable beam 56 may move from the folded to the deployed position passively using a ratchet and pawl, as described above, either with or without the variable flotation body 90.

FIGS. 17 through 22 describe the operation of a control system to manage the wind turbine 2, including the aeronautical features 26 and the anchor line force vector 44 features.

Figure 17:
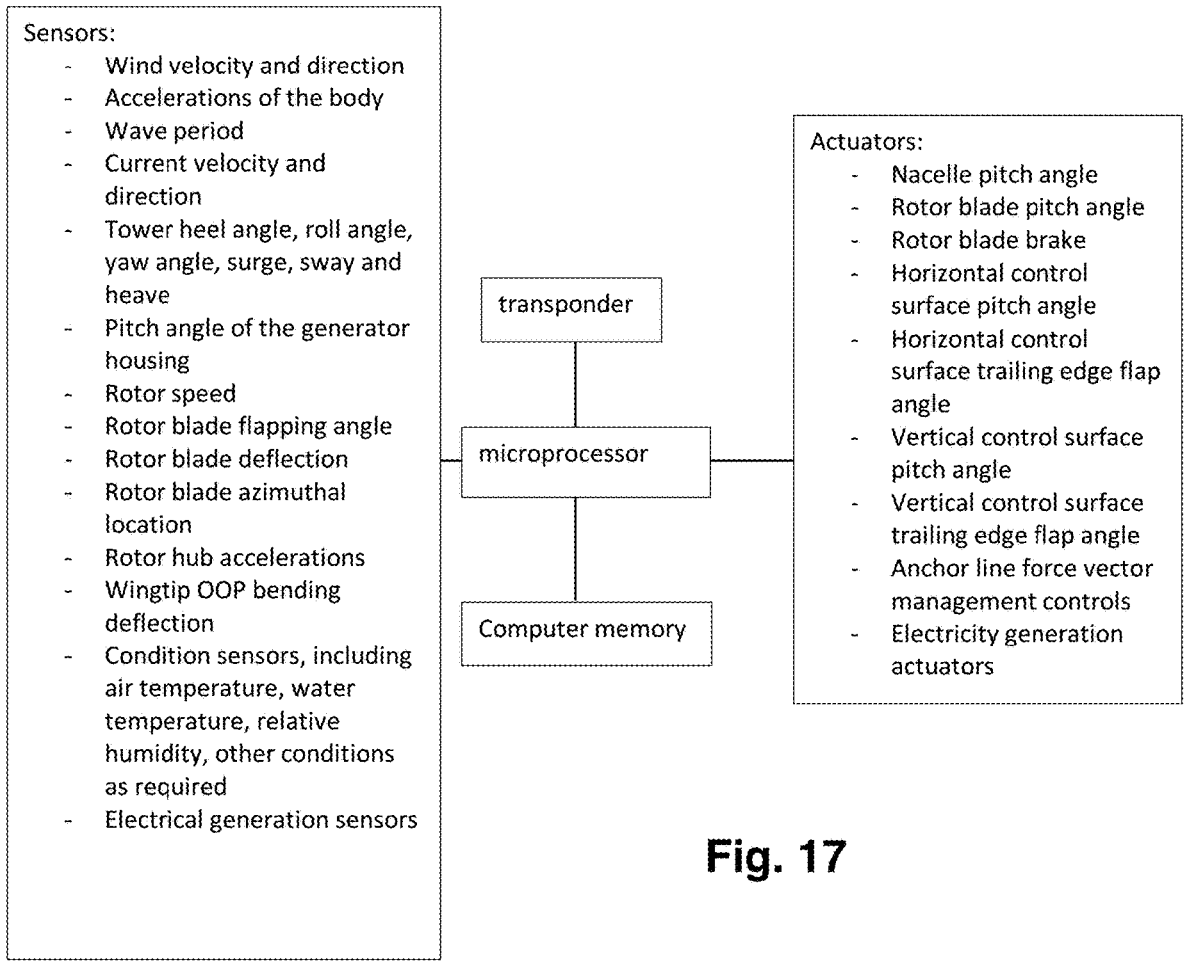
FIG. 17 is a schematic diagram of the control system.

FIG. 17 is a schematic diagram of the hardware of the control system. The control system comprises a microprocess and computer memory. The microprocessor may be operably attached to a radio transponder so that the control system may communicate and receive communications from a remote operator or so that the wind turbine 2 may receive weather or other information convenient for wind turbine 2 operations.

The control system is connected to sensors that may detect any information useful for wind turbine 2 operation. The information detected may include wind velocity and direction, accelerations of the buoyant body, wave period, current velocity and direction, heel angle, pitch angle of the nacelle 18, rotor speed, rotor blade flapping angle and rotor blade deflection, the rotor blade azimuthal location, rotor hub accelerations, wingtip OOP bending deflection, conditions such as air temperature, water temperature, relative humidity, and electrical generation sensors. The sensors may detect rotor hub 14 positions and accelerations and may monitor the six degrees of freedom of the floating wind turbine 2, including heave (movement in the vertical direction), yaw (rotation about a vertical axis), surge (movement forward and aft), roll (rotation about a horizontal axis running fore and aft of the wind turbine 2), sway (movement to port and starboard), and pitch (rotation about a horizontal axis running port and starboard of the wind turbine 2).

The control system will include actuators capable of executing the commands of the control system, which may include actuators to control nacelle 18 pitch angle and rotor blade 24 pitch angle, which may be collective pitch, cyclic pitch, or both collective and cyclic pitch. The actuators also may include actuators for horizontal control surface 32 and vertical control surface 34 pitch angle. The horizontal and vertical control surfaces 32, 34 of each aeronautical feature 26 may be independently controlled and may be moved differentially or non-differentially. The control system may control the anchor line force vector 44 adjustment apparatus, which may include any of the systems described above or any other system configured to adjust the location of attachment of the anchor line 66. The control system also will monitor and control electrical generation parameters, which are beyond the scope of this document.

Figure 18:
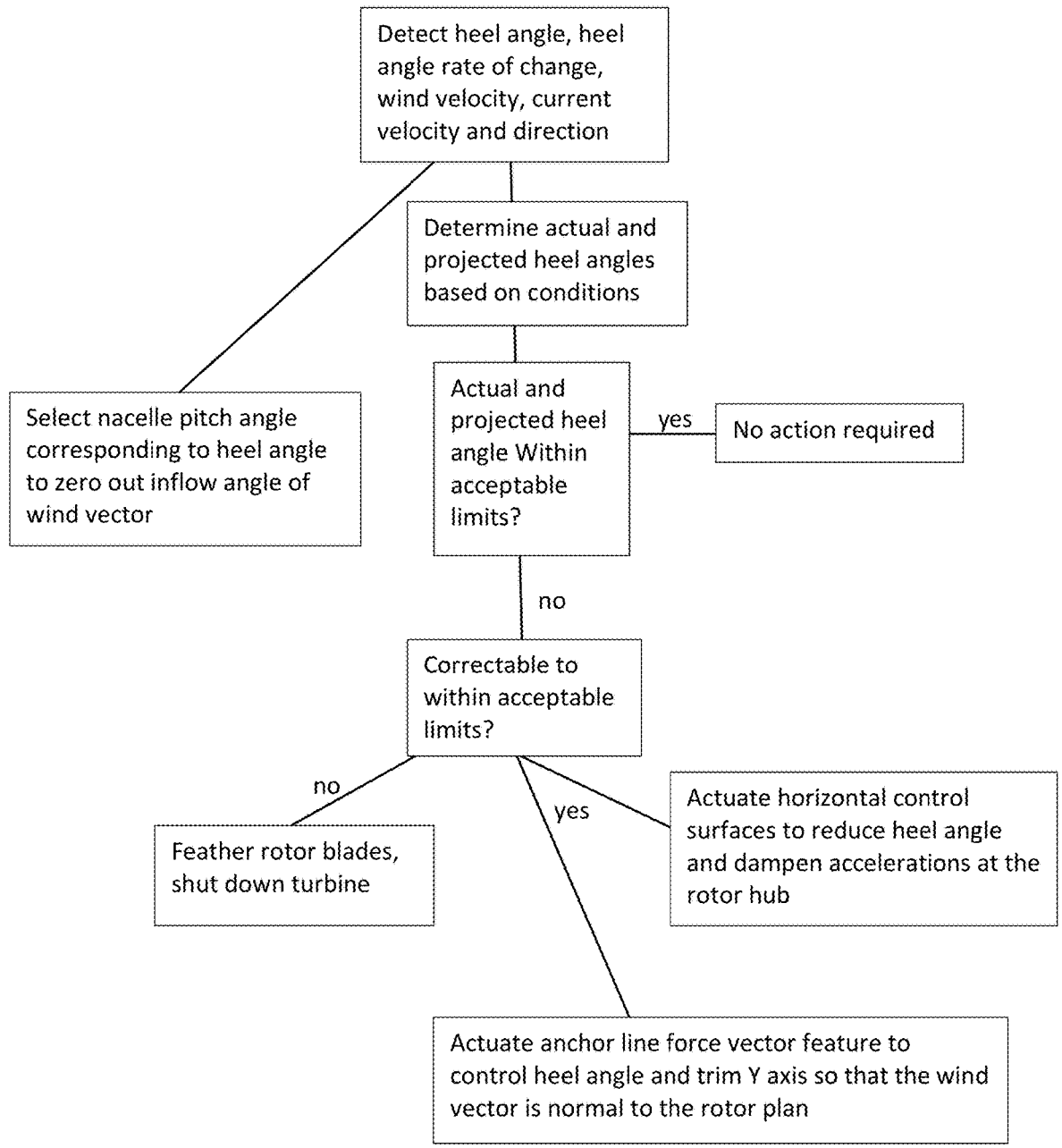
FIG. 18 is a flow chart of the actions of the control system relating to heel angle.

FIG. 18 is a flow chart showing the action of the control system to control heel, which is also referred to as 'pitch' in the six degrees of freedom of the motion of the wind turbine 2. In the example of FIG. 18, the wind turbine 2 is equipped with both aerodynamic features 26 and anchor line force vector 44 adjustment features. For the wind turbine 2 of FIG. 18, the control system monitors the heel angle and may monitor the rate of change of the heel angle. The control system commands adjustment to the pitch angle of the nacelle 18, including the generator 16, rotor hub 14, and rotor axis of rotation 20. The nacelle 18 actuators adjust the pitch angle of the nacelle 18 to maintain the generator 16, rotor 12 and rotor axis of rotation 20 in a horizontal condition.

The control system also determines whether the actual and projected heel angles are and will be within acceptable limits. If so, then no action by the control system is necessary to control heel angle. If the actual or projected heel angle is outside of acceptable limits, the control system will determine whether the control system has the control authority to maintain the heel angle within acceptable limits using the aeronautical features 26 and the anchor line force vector 44 features. If so, the control system will deploy either or both of those systems 26, 44 to bring the heel angle under control. If not, the control system will shut down the wind turbine 2.

Figure 19:
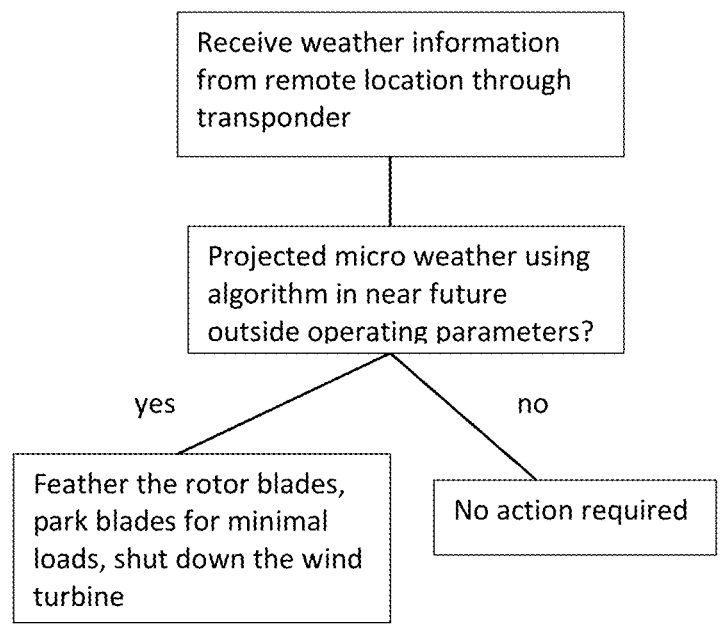
FIG. 19 is a flow chart of the actions of the control system informed of a weather condition.

FIG. 19 illustrates that the control system may receive information remotely and take action accordingly, as by shutting down the wind turbine 2 if severe weather threatens.

FIGS. 20, 21 and 22 show that the control authority provided by the aeronautical features of the horizontal 32 and vertical control surfaces 34 may assist the control system in controlling motions in the six degrees of freedom that the floating wind turbine 2 may experience. The control system will use sensors to detect yaw, roll, pitch, heave, surge and sway of the wind turbine 2. As noted above, yaw is rotation of the wind turbine 2 about a vertical axis. Roll is rotation about a horizontal axis running fore and aft on the wind turbine 2. Pitch, also referred to herein as 'heel,' is rotation about a horizontal axis running between port and starboard on the floating wind turbine 2. Surge is movement of the wind turbine 2 in the fore and aft directions. Heave is movement up and down in the vertical direction. Sway is movement to port and starboard.

From FIGS. 20, 21 and 22, the control system will determine whether movement in each of the six degrees of freedom is or is projected to be within acceptable limits. If so, then no further action is required. If not, the control system will determine whether adequate control authority exists in the aeronautical features to bring the movement within acceptable limits. If so, the control authority will move the horizontal 32 and vertical control surfaces 34 to control that movement. If not, the control system will take steps to shut down the wind turbine 2.

For yaw and pitch, the control system may use both the aerodynamic features 26 and anchor line force vector 44 actuators. To control yaw, the control system may cause actuators to move the vertical control surfaces 34 on the upwind and downwind sides differentially to cause the wind turbine 2 to rotate in opposition to the detected yaw. The control system also may adjust the location of the achor line force vector 44 to adjust yaw. To control pitch, the control system will cause the horizontal control surfaces 32 to move differentially fore and aft to cause the wind turbine 2 to move in opposition to the detected pitch. The control system also may cause the anchor line force vector 44 actuators to move the anchor line attachment location and to increase or decrease the righting moment applied by the vertical 50 or horizontal 48 component of the anchor line force vector 44.

To control roll, the control system may cause actuators to move the horizontal control surfaces 32 differentially port and starboard. To control heave, the control system may cause the horizontal control surface to move non-differentially to provide additional downward force when the water 22 lifts the wind turbine 2 and to provide additional upward force when the water 22 lowers the wind turbine 2. To control surge, the control system may apply the horizontal and vertical control surfaces 34 in opposition to present greater aerodynamic drag to movement in the fore and aft directions. To control sway, the control system may cause the vertical control surfaces 34 to move non-differentially to effectively sail the wind turbine 2 in the direction opposite to the detected sway.

Because each of the motions in the six degrees of freedom of the floating wind turbine 2 are periodic, the control system will reverse the commanded motions of the horizontal and vertical control surfaces 34 consistent with the period of the motions, dampening the motions.

Any of the features of any of the embodiments of the invention discussed above may be applied to or combined with the features of any other embodiment discussed above. Any of the mechanisms discussed above to move one embodiment of the invention may be used to move a different embodiment.

LIST OF ELEMENTS

The following is a list of the numbered elements appearing in the specification and drawings.
2 offshore floating wind turbine 4 buoyant body
6 center of buoyancy
8 center of gravity
10 tower
12 rotor
14 rotor hub
16 generator
18 nacelle
20 rotor axis of rotation
22 water
24 rotor blades
26 aerodynamic features
28 open lattice
30 rotor disc
32 horizontal control surfaces
34 vertical control surfaces
36 horizontal axis of rotation of a horizontal control surface
38 support structure
40 vertical axis of a vertical control surface
42 Nacelle hinge
44 anchor line force vector
46 wind
48 horizontal component of the anchor line force vector
50 vertical component of the anchor line force vector
52 weight of the wind turbine
54 buoyancy force vector
56 rotatable beam
58 pin connection
60 hydraulic cylinder
62 flexible member
64 shaped cam
66 anchor line
68 extendable beam
70 track
72 rack
74 pinion
76 extendable knee
78 slider
82 first link
84 second link
86 lead screw
88 shuttle
90 variable flotation body
92 supply line
94 valves
96 box wing
98 extensions to the vertical control surfaces
100 vertical control surface trailing edge flaps
102 horizontal control surface trailing edge flaps

We claim:

1. A floating off-shore wind turbine apparatus, the apparatus comprising:
   a) a rotor configured for rotation in response to a wind;
   b) a generator, the generator is operably attached to the rotor and configured to generate electrical power in response to rotation of the rotor;
   c) a tower, the tower configured to support the generator and rotor above a surface of a water when the rotor is rotating, the tower being elongated along a longitudinal axis;
   d) a buoyant body, the buoyant body being configured to support the tower above the surface of the water when the buoyant body is floating on the water, the buoyant body being elongated along the longitudinal axis, a length of the buoyant body along the longitudinal axis being greater than a width of the buoyant body normal to the longitudinal axis, the buoyant body having a center of buoyancy, the buoyant body, the tower, the generator and the rotor in combination having a center of gravity, the center of buoyancy and the center of gravity being in a spaced-apart relation, the center of buoyancy being proximal to the tower, the center of gravity being distal to the tower;
   e) an aerodynamic feature, the aerodynamic feature is attached to the tower or buoyant body, the aerodynamic feature being in a spaced-apart relation to the longitudinal axis, the aerodynamic feature being exposed to the wind when the buoyant body is floating on the water, the aerodynamic feature is configured to apply a selectable control force or moment to the buoyant body in response to the wind blowing on the aerodynamic feature;
   f) an anchor line, the anchor line is configured to attach the buoyant body to a seafloor;
   g) an active control system, the active control system is operably attached to the aerodynamic feature and configured to select the selectable force or control moment applied to the buoyant body by the aerodynamic feature wherein the aerodynamic feature is a horizontal control surface, the horizontal control surface being movable about a horizontal axis of rotation by a horizontal control actuator as directed by the active control system.

2. The floating off-shore wind turbine apparatus of claim 1, the apparatus further comprising:
   a) a pitch hinge connecting the tower to the generator and rotor, the generator and rotor being movable in pitch about the pitch hinge;
   b) a pitch actuator, the pitch actuator being configured to move the generator and rotor in pitch about the pitch hinge, the pitch actuator being operably connected to the control system to maintain the generator and wind turbine in a horizontal condition perpendicular to the wind.

3. A floating off-shore wind turbine apparatus, the apparatus comprising:
   a) a rotor configured for rotation in response to a wind;
   b) a generator, the generator is operably attached to the rotor and configured to generate electrical power in response to rotation of the rotor;
   c) a tower, the tower configured to support the generator and rotor above a surface of a water when the rotor is rotating, the tower being elongated along a longitudinal axis;
   d) a buoyant body, the buoyant body being configured to support the tower above the surface of the water when the buoyant body is floating on the water, the buoyant body being elongated along the longitudinal axis, a length of the buoyant body along the longitudinal axis being greater than a width of the buoyant body normal to the longitudinal axis, the buoyant body having a center of buoyancy, the buoyant body, the tower, the generator and the rotor in combination having a center of gravity, the center of buoyancy and the center of gravity being in a spaced-apart relation, the center of buoyancy being proximal to the tower, the center of gravity being distal to the tower;
   e) an aerodynamic feature, the aerodynamic feature is attached to the tower or buoyant body, the aerodynamic feature being in a spaced-apart relation to the longitudinal axis, the aerodynamic feature being exposed to the wind when the buoyant body is floating on the water, the aerodynamic feature is configured to apply a selectable control force or moment to the buoyant body in response to the wind blowing on the aerodynamic feature;

f) an anchor line, the anchor line is configured to attach the buoyant body to a seafloor;

g) an active control system, the active control system is operably attached to the aerodynamic feature and configured to select the selectable force or control moment applied to the buoyant body by the aerodynamic feature wherein the aerodynamic feature is a vertical control surface, the vertical control surface being movable about a vertical axis of rotation by a vertical control actuator as directed by the active control system.

4. A floating off-shore wind turbine apparatus, the apparatus comprising:

a) a rotor configured for rotation in response to a wind;

b) a generator, the generator is operably attached to the rotor and configured to generate electrical power in response to rotation of the rotor;

c) a tower, the tower configured to support the generator and rotor above a surface of a water when the rotor is rotating, the tower being elongated along a longitudinal axis;

d) a buoyant body, the buoyant body being configured to support the tower above the surface of the water when the buoyant body is floating on the water, the buoyant body being elongated along the longitudinal axis, a length of the buoyant body along the longitudinal axis being greater than a width of the buoyant body normal to the longitudinal axis, the buoyant body having a center of buoyancy, the buoyant body, the tower, the generator and the rotor in combination having a center of gravity, the center of buoyancy and the center of gravity being in a spaced-apart relation, the center of buoyancy being proximal to the tower, the center of gravity being distal to the tower;

e) an aerodynamic feature, the aerodynamic feature is attached to the tower or buoyant body, the aerodynamic feature being in a spaced-apart relation to the longitudinal axis, the aerodynamic feature being exposed to the wind when the buoyant body is floating on the water, the aerodynamic feature is configured to apply a selectable control force or moment to the buoyant body in response to the wind blowing on the aerodynamic feature;

f) an anchor line, the anchor line is configured to attach the buoyant body to a seafloor;

g) an active control system, the active control system is operably attached to the aerodynamic feature and configured to select the selectable force or control moment applied to the buoyant body by the aerodynamic feature wherein the aerodynamic feature is a plurality of aerodynamic control surfaces, each of the aerodynamic control surfaces being radially distributed about the longitudinal axis in the spaced-apart relation to the longitudinal axis.

5. The floating off-shore wind turbine apparatus of claim 4 wherein the plurality of aerodynamic control surfaces comprises: a plurality of horizontal control surfaces and vertical control surfaces.

6. The floating off-shore wind turbine apparatus of claim 5 wherein each of the plurality of aerodynamic control surfaces comprises a box wing.

7. A floating off-shore wind turbine apparatus, the apparatus comprising:

a) a rotor configured for rotation in response to a wind;

b) a generator, the generator is operably attached to the rotor and configured to generate electrical power in response to rotation of the rotor;

c) a tower, the tower configured to support the generator and rotor above a surface of a water when the rotor is rotating, the tower being elongated along a longitudinal axis;

d) a buoyant body, the buoyant body being configured to support the tower above the surface of the water when the buoyant body is floating on the water, the buoyant body being elongated along the longitudinal axis, a length of the buoyant body along the longitudinal axis being greater than a width of the buoyant body normal to the longitudinal axis, the buoyant body having a center of buoyancy, the buoyant body, the tower, the generator and the rotor in combination having a center of gravity, the center of buoyancy and the center of gravity being in a spaced-apart relation, the center of buoyancy being proximal to the tower, the center of gravity being distal to the tower;

e) an aerodynamic feature, the aerodynamic feature is attached to the tower or buoyant body, the aerodynamic feature being in a spaced-apart relation to the longitudinal axis, the aerodynamic feature being exposed to the wind when the buoyant body is floating on the water, the aerodynamic feature is configured to apply a selectable control force or moment to the buoyant body in response to the wind blowing on the aerodynamic feature;

f) an anchor line, the anchor line is configured to attach the buoyant body to a seafloor;

g) an active control system, the active control system is operably attached to the aerodynamic feature and configured to select the selectable force or control moment applied to the buoyant body by the aerodynamic feature wherein the aerodynamic feature is a control surface, the control surface having an angle of attack of the control surface to the wind, the control system comprises: at least one sensor and at least one control surface actuator, the at least one sensor being configured to detect a wind speed and a wind direction, the control system being configured to cause the at least one actuator to change an angle of attack of the control surfaces based on the detected wind speed and the detected wind direction.

8. The floating off-shore wind turbine apparatus of claim 7 wherein the control surface is a plurality of control surfaces, the plurality of control surfaces having one or more angles of attack with respect to the wind, the control system comprising a plurality of control actuators, the plurality of control actuators being configured to adjust the angle of attack of each of the plurality of control surfaces.

9. The floating off-shore wind turbine apparatus of claim 7 wherein the control system is configured to feather and stop the rotor when the at least one sensor detects the wind speed and wind direction outside of an allowable operating limit.

10. A floating off-shore wind turbine apparatus, the apparatus comprising:

a) a rotor configured for rotation in response to a wind;

b) a generator, the generator is operably attached to the rotor and configured to generate electrical power in response to rotation of the rotor;

c) a tower, the tower configured to support the generator and rotor above a surface of a water when the rotor is rotating, the tower being elongated along a longitudinal axis;

d) a buoyant body, the buoyant body being configured to support the tower above the surface of the water when the buoyant body is floating on the water, the buoyant body being elongated along the longitudinal axis, a length of the buoyant body along the longitudinal axis being greater than a width of the buoyant body normal to the longitudinal axis, the buoyant body having a center of buoyancy, the buoyant body, the tower, the generator and the rotor in combination having a center of gravity, the center of buoyancy and the center of gravity being in a spaced-apart relation, the center of buoyancy being proximal to the tower, the center of gravity being distal to the tower;

e) an anchor line, the anchor line is configured to attach the buoyant body to a sea floor;

f) an active control system, the anchor line is configured to apply an anchor line force vector to the buoyant body through a point attached to the buoyant body when the buoyant body is floating on the water, the buoyant body and the control system having a configuration to move the point with respect to the longitudinal axis.

11. The floating off-shore wind turbine apparatus of claim 10 wherein the configuration of the buoyant body and the control system to move the point with respect to the longitudinal axis of the buoyant body comprising: one or more anchor line actuators under the control of the control system.

12. The floating off-shore wind turbine apparatus of claim 11 wherein the anchor line actuators are configured to move the point both away from and toward the longitudinal axis.

13. The floating off-shore wind turbine apparatus of claim 11 wherein the anchor line actuators are configured to both raise and lower the point with respect to the center of gravity.

14. The floating off-shore wind turbine apparatus of claim 11 wherein the anchor line actuators are configured to move the point both away from and toward the longitudinal axis, and the anchor line actuators are configured to both raise and lower the point with respect to the center of gravity.

15. The floating off-shore wind turbine apparatus of claim 11, the apparatus further comprising: a rotatable beam, the rotatable beam being rotatably attached to the buoyant body, the point being located on the rotatable beam, the rotatable beam being rotatable by the one or more anchor line actuators between a first rotatable beam position and a second rotatable beam position, the point being proximal to the longitudinal axis when the rotatable beam is in the first rotatable beam position, the point being distal to the longitudinal axis when the rotatable beam is in the second rotatable beam position, the point being rotatable to a position intermediate to the first rotatable beam position and the second rotatable beam position.

16. The floating off-shore wind turbine apparatus of claim 15, the apparatus further comprising: a variable flotation body attached to the rotatable beam and configured to selectably retain air, the anchor line actuators being configured to selectably pump air into the variable flotation body, the variable flotation body being configured so that the air contained within the variable flotation body provides a buoyancy to the rotatable beam, the variable flotation beam being configured to selectably release the air.

17. The floating off-shore wind turbine apparatus of claim 11, the apparatus further comprising: an extendable beam, the extendable beam being attached to the buoyant body, the point being located on the extendable beam, the extendable beam being extendable by the one or more anchor line actuators between a first extendable beam position and a second extendable beam position, the point being proximal to the longitudinal axis when the extendable beam is in the first extendable beam position, the point being distal to the longitudinal axis when the extendable beam is in the second extendable beam position.

18. The floating off-shore wind turbine apparatus of claim 11, the apparatus further comprising: two links joined by a knee hinge to create an extendable knee, the extendable knee being attached to the buoyant body, the point being located on the extendable knee, the extendable knee being extendable by the one or more anchor line actuators between a first extendable knee position and a second extendable knee position, the point being proximal to the longitudinal axis when the extendable knee is in the first extendable knee position, the point being distal to the longitudinal axis when the extendable knee is in the second extendable knee position.

19. The floating off-shore wind turbine apparatus of claim 11, the apparatus further comprising:
  a) a track, the track being attached to the buoyant body;
  b) a shuttle, the point being located on the shuttle, the shuttle being movable on the track by the one or more anchor line actuators between a first shuttle position and a second shuttle position, the point being proximal to the longitudinal axis when the shuttle is in the first shuttle position, the point being distal to the longitudinal axis when the shuttle is in the second shuttle position.

* * * * *